A1 US010366319B2

(12) United States Patent
Junk et al.

(10) Patent No.: US 10,366,319 B2
(45) Date of Patent: Jul. 30, 2019

(54) MOUNTING BRACKET APPARATUS TO AMPLIFY ELECTROMAGNETIC FIELD STRENGTHS ASSOCIATED WITH MOUNTABLE RFID

(71) Applicant: Fisher Controls International LLC, Marshalltown, IA (US)

(72) Inventors: Kenneth William Junk, Marshalltown, IA (US); Shannon Eugene Jelken, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 15 days.

(21) Appl. No.: 15/692,874

(22) Filed: Aug. 31, 2017

(65) Prior Publication Data
US 2019/0065923 A1 Feb. 28, 2019

(51) Int. Cl.
*G06K 19/06* (2006.01)
*G06K 19/077* (2006.01)
*F16M 13/02* (2006.01)
*G06K 19/07* (2006.01)

(52) U.S. Cl.
CPC ........ *G06K 19/07745* (2013.01); *F16M 13/02* (2013.01); *G06K 19/0723* (2013.01); *G06K 19/07771* (2013.01)

(58) Field of Classification Search
CPC .......... F16M 13/02; H02G 3/14; H02G 3/123; G06K 19/0723; G06K 19/077; G06K 19/07745; G06K 19/07749; G06K 7/10009
See application file for complete search history.

(56) References Cited

U.S. PATENT DOCUMENTS

| | | | | |
|---|---|---|---|---|
| 7,156,301 B1 * | 1/2007 | Bonalle | ................ | G06K 19/04 235/380 |
| 7,434,734 B2 * | 10/2008 | Huber | .................. | G06K 19/04 235/487 |
| 8,608,086 B1 | 12/2013 | Mizzo et al. | | |
| 9,361,570 B2 * | 6/2016 | Nitta | ................... | G06K 19/077 |
| 9,918,537 B2 * | 3/2018 | Warther | .......... | G06K 19/07726 |

(Continued)

OTHER PUBLICATIONS

HID Global, "IronTag Datasheet," [https://www.hidglobal.com/sites/default/files/resource_files/hid-rfid-il-iron-tag-ds-en.pdf], retrieved on Aug. 30, 2017, dated Mar. 28, 2017, 2 pages.

(Continued)

*Primary Examiner* — Thien M Le
*Assistant Examiner* — April A Taylor
(74) *Attorney, Agent, or Firm* — Hanley, Flight & Zimmerman, LLC

(57) ABSTRACT

Mounting bracket apparatus to amplify electromagnetic field strengths associated with mountable RFID tags are disclosed. An example apparatus includes a mounting bracket having a central portion, a first field amplification arm extending from the central portion in a first direction, a second field amplification arm extending from the central portion in a second direction different from the first direction, and a mounting arm extending from the central portion in a third direction different from the first direction and the second direction. The example apparatus further includes a radio frequency identification (RFID) tag mounted to the central portion of the mounting bracket.

20 Claims, 18 Drawing Sheets

(56) References Cited

U.S. PATENT DOCUMENTS

| | | | | |
|---|---|---|---|---|
| 2002/0170213 | A1* | 11/2002 | Latschbacher | A01G 23/099 |
| | | | | 40/299.01 |
| 2006/0192677 | A1* | 8/2006 | Huber | G06K 19/04 |
| | | | | 340/572.8 |
| 2010/0140427 | A1* | 6/2010 | Myers | G08G 1/065 |
| | | | | 248/214 |
| 2010/0315545 | A1* | 12/2010 | Tamura | G02B 15/173 |
| | | | | 348/349 |
| 2012/0248283 | A1* | 10/2012 | Chen | B60R 13/105 |
| | | | | 248/551 |
| 2014/0021265 | A1 | 1/2014 | Kai et al. | |
| 2014/0240097 | A1 | 8/2014 | Karani et al. | |
| 2014/0361090 | A1* | 12/2014 | Baba | G06K 19/07758 |
| | | | | 235/492 |
| 2016/0343175 | A1* | 11/2016 | Nyalamadugu | G06K 19/041 |
| 2017/0236047 | A1* | 8/2017 | Hansen | A42B 3/0433 |
| | | | | 235/488 |
| 2017/0256927 | A1* | 9/2017 | Padilla | H02G 3/14 |
| 2018/0293481 | A1* | 10/2018 | Zheng | B61L 1/20 |

OTHER PUBLICATIONS

HID Global White Paper, "HID Global Industrial RFID & BLE Tags: What to Use When," HID Global Corporation/ASSA ABLOY AB, dated Jun. 20, 2017, 16 pages.

International Searching Authority, "International Search Report," issued in connection with International Patent Application No. PCT/US2018/045769, dated Nov. 14, 2018, 6 pages.

International Searching Authority, "Written Opinion," issued in connection with International Patent Application No. PCT/US2018/045769, dated Nov. 14, 2018, 5 pages.

\* cited by examiner

MOUNTING BRACKET APPARATUS TO AMPLIFY ELECTROMAGNETIC FIELD STRENGTHS ASSOCIATED WITH MOUNTABLE RFID

FIELD OF THE DISCLOSURE

This disclosure relates generally to mountable radio frequency identification (RFID) tags and, more specifically, to mounting bracket apparatus to amplify electromagnetic field strengths associated with mountable RFID tags.

BACKGROUND

RFID tags include radio frequency circuitry that enables data and/or information (e.g., identification information) stored on and/or stored in the RFID tag to be read by and/or otherwise communicated to a remotely-located RFID tag reader and/or interrogator to provide the identity and/or location of the RFID tag. In industrial process environments, RFID tags are commonly fastened, coupled, and/or mounted to field devices and/or process equipment such that the identities and/or locations of such devices and/or equipment within the process environment may be remotely determined.

SUMMARY

Mounting bracket apparatus to amplify electromagnetic field strengths associated with mountable RFID tags are disclosed herein. In some disclosed examples, an apparatus comprises a mounting bracket having a central portion, a first field amplification arm extending from the central portion in a first direction, a second field amplification arm extending from the central portion in a second direction different from the first direction, and a mounting arm extending from the central portion in a third direction different from the first direction and the second direction. In some disclosed examples, the apparatus further comprises an RFID tag mounted to the central portion of the mounting bracket.

In some disclosed examples, an apparatus comprises a mounting bracket having a central portion, a first field amplification arm extending from the central portion in a first direction, a second field amplification arm extending from the central portion in a second direction different from the first direction, and a mounting arm extending from the central portion in a third direction different from the first direction and the second direction. In some disclosed examples, the central portion has a through hole to receive a fastener to mount an RFID tag to the central portion.

In some disclosed examples, an apparatus comprises a mounting bracket having a central portion, a first field amplification arm extending from the central portion in a first direction, a second field amplification arm extending from the central portion in a second direction different from the first direction, and a mounting arm extending from the central portion in a third direction different from the first direction and the second direction. In some disclosed examples, the apparatus further comprises an RFID tag mounted to the central portion of the mounting bracket. In some disclosed examples, the apparatus further comprises an adapter bracket to be coupled to the mounting bracket.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

In industrial process environments, RFID tags are commonly fastened, coupled, and/or mounted to field devices and/or process equipment such that the identities and/or locations of such devices and/or equipment within the process environment may be remotely determined. In some instances, a field device or an item of process equipment to which an RFID tag is mounted may not be directly accessible, such as when the device or equipment is positioned in a restricted area, or when the device or equipment is blocked off by an obstacle. Attempting to directly access the field device or the item of process equipment in such instances may place workers at risk. Such risk may be reduced (e.g., eliminated) by increasing the communication range (e.g., the read range) associated with the RFID tag.

In isolation, known mountable RFID tags commonly have maximum communication ranges (e.g., maximum read ranges) of five feet or less. When such RFID tags are mounted to the mounting bracket apparatus disclosed herein, the disclosed mounting bracket apparatus advantageously amplify the electromagnetic field strengths associated with the RFID tags, and accordingly increase the maximum communication ranges (e.g., maximum read ranges) associated with the RFID tags. In some examples, the disclosed mounting brackets may increase the maximum communication ranges (e.g., maximum read ranges) associated with the RFID tags to fifteen feet or more. The disclosed mounting brackets accordingly enable an RFID tag reader and/or interrogator to determine the identity and/or location of the RFID tag, and/or an object to which the RFID tag may be fastened, coupled, and/or mounted, from a safely-positioned remote location.

Figure 1:
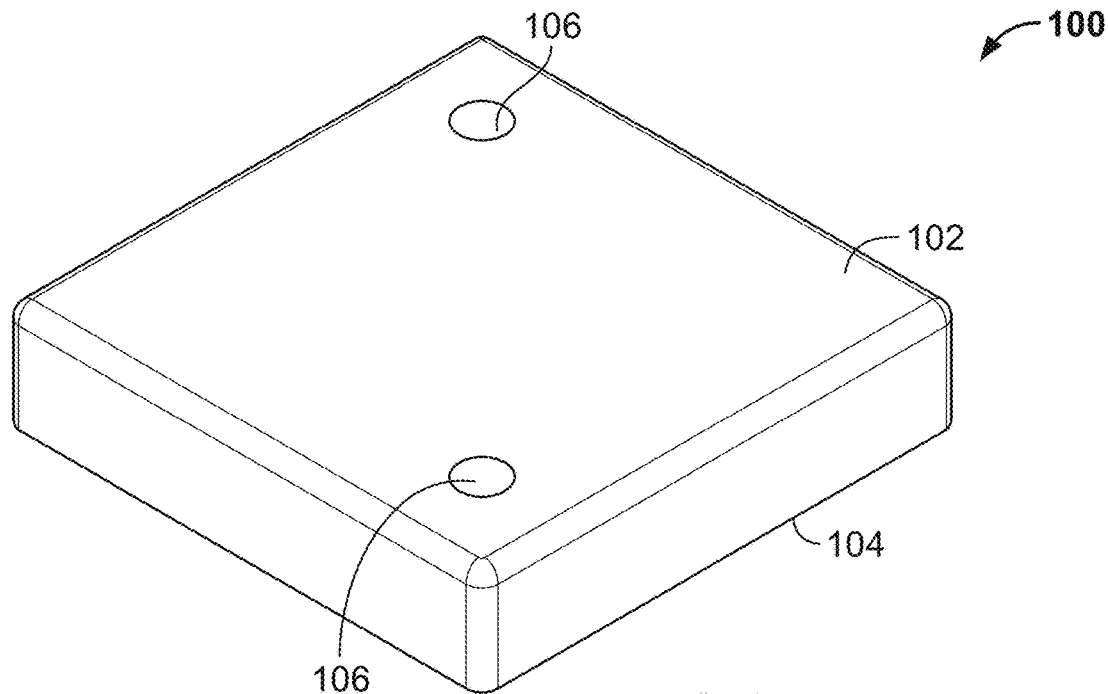
FIG. 1 is a perspective view of an example RFID tag constructed in accordance with the teachings of this disclosure.

FIG. 1 is a perspective view of an example RFID tag 100 constructed in accordance with the teachings of this disclosure. The RFID tag 100 of FIG. 1 includes an example front surface 102 and an example back surface 104 located opposite the front surface 102. In the illustrated example of FIG. 1, the front surface 102, the back surface 104, and/or, more generally, the RFID tag 100 has/have a rectangular shape. For example, as shown in FIG. 1, the RFID tag 100 has a length of approximately 31.0 millimeters, a width of approximately 31.0 millimeters, and a thickness of approximately 6.9 millimeters, where the length and width are the dimensions of the front surface 102 of the RFID tag 100 and the thickness is the dimension between the front surface 102 and the back surface 104 of the RFID tag 100. In other examples, the front surface 102, the back surface 104, and/or, more generally, the RFID tag 100 may have shapes and/or dimensions differing from those described above. For example, the front surface 102, the back surface 104, and/or, more generally, the RFID tag 100 may have a circular shape, an elliptical shape, a triangular shape, etc., or may have dimensions that are greater than or less than the dimensions described above.

In the illustrated example of FIG. 1, the RFID tag 100 also includes example through holes 106 passing from the front surface 102 of the RFID tag 100 through to the back surface 104 of the RFID tag 100. Respective ones of the through holes 106 are configured to receive a corresponding fastener (not shown) to fasten, couple, and/or mount the RFID tag 100 to a mounting bracket. The fastener(s) may include, for example, one or more screw(s), bolt(s), rivet(s), stud(s), boss(es), band(s), cable tie(s), etc. In some examples, the fastener(s) are preferably formed of a metallic material. In the illustrated example of FIG. 1, the RFID tag 100 includes a total of two through holes 106, with the two through holes 106 being respectively located relative to one another at diagonally-opposed corners of the RFID tag 100. In other examples, the RFID tag 100 may include a different number of through holes 106 (e.g., one, three, four, etc.), and such through holes 106 may be located at positions differing from those shown in FIG. 1.

The RFID tag 100 of FIG. 1 includes radio frequency circuitry (e.g., located within the RFID tag 100 between the front surface 102 and the back surface 104 of FIG. 1) that enables data and/or information (e.g., identification information) stored on and/or stored in the RFID tag 100 to be read by and/or otherwise communicated to a remotely-located RFID tag reader and/or interrogator to provide the identity and/or location of the RFID tag 100. In some examples, the RFID tag 100 of FIG. 1 operates at and/or is responsive to a radio frequency band having a center frequency of approximately 915 MHz. In some such examples, the maximum communication range (e.g., the maximum read range) associated with the RFID tag 100 of FIG. 1 in isolation (e.g., the RFID tag 100 not mounted to a mounting bracket) is less than five feet (e.g., about two to three feet).

Figure 2:
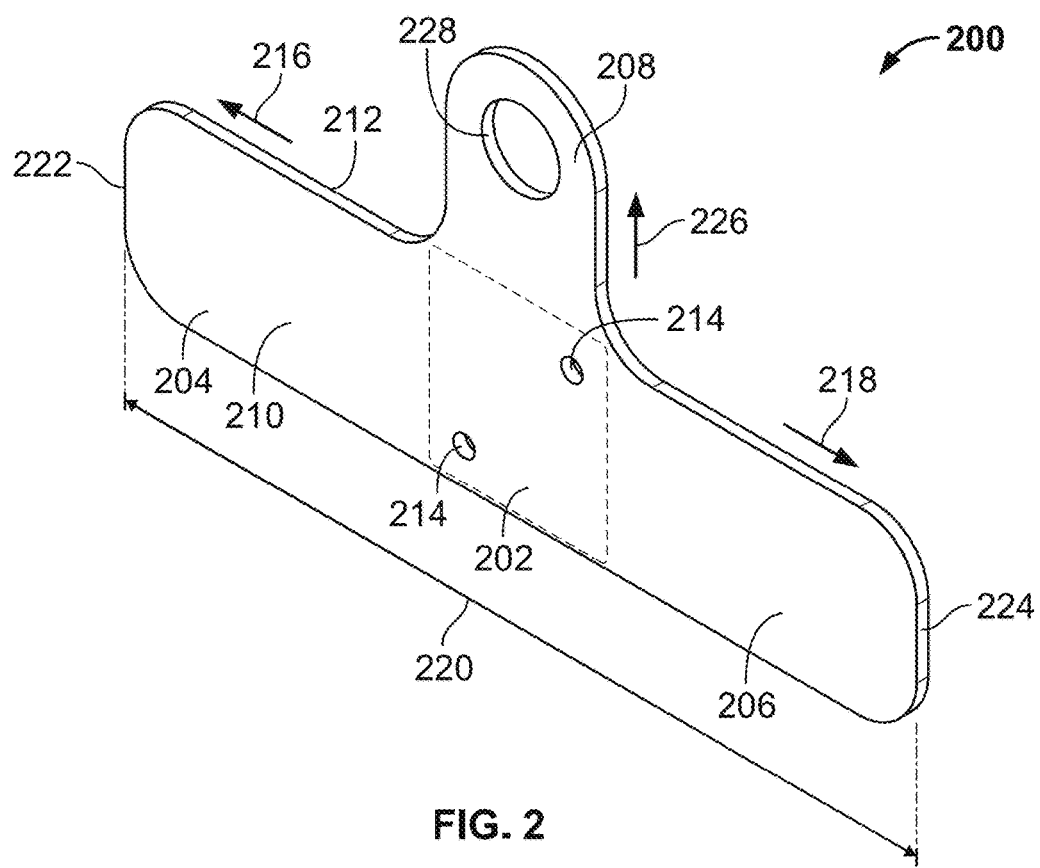
FIG. 2 is a perspective view of a first example mounting bracket constructed in accordance with the teachings of this disclosure.
Figure 3:
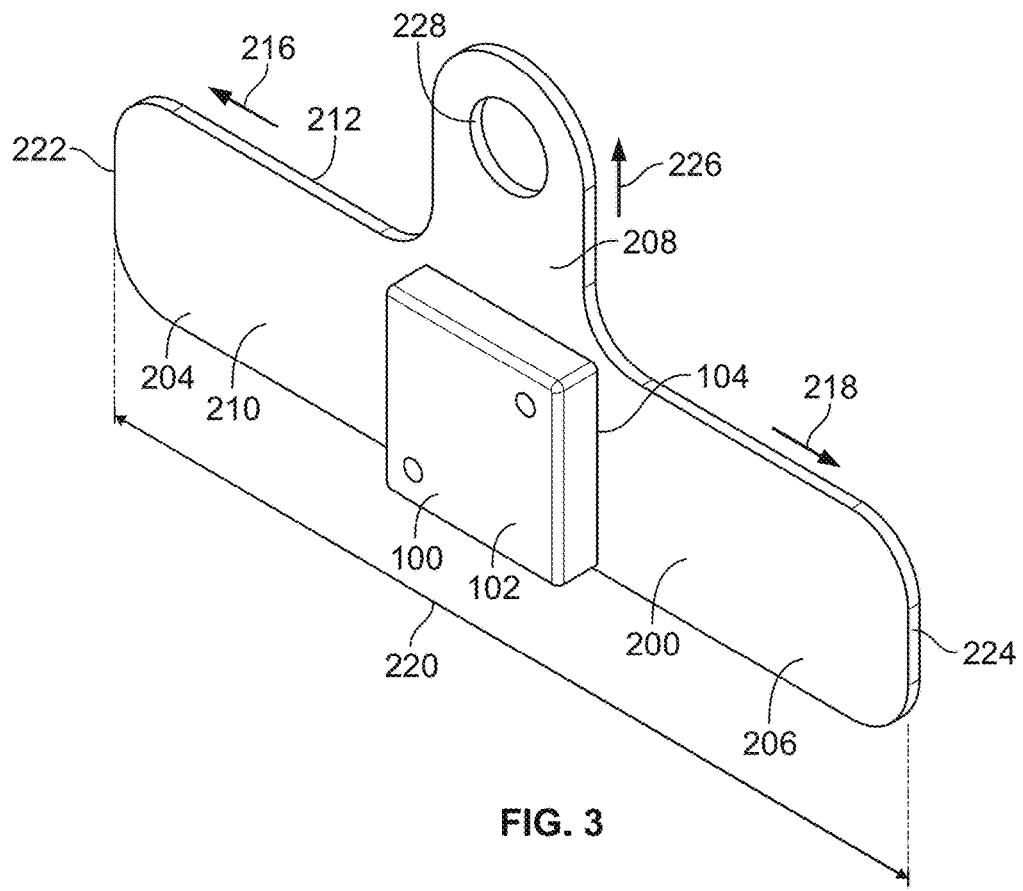
FIG. 3 is a perspective view of the first example mounting bracket of FIG. 2 having the example RFID tag of FIG. 1 mounted thereto.
Figure 4:
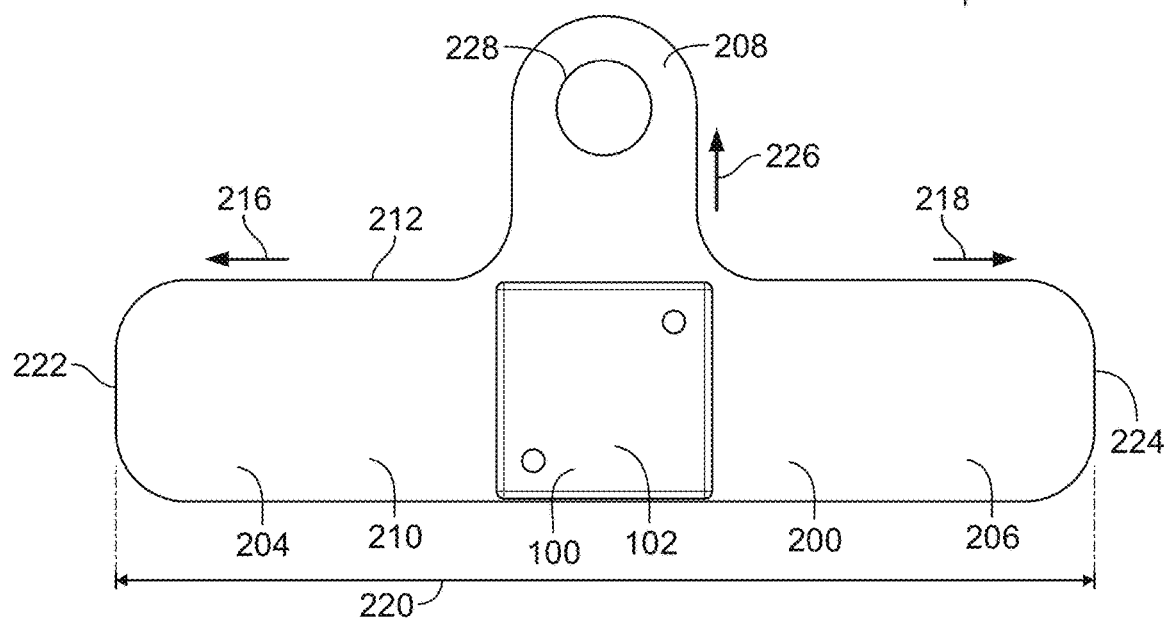
FIG. 4 is a front view of the first example mounting bracket of FIGS. 2 and 3 having the example RFID tag of FIG. 1 mounted thereto.
Figure 5:
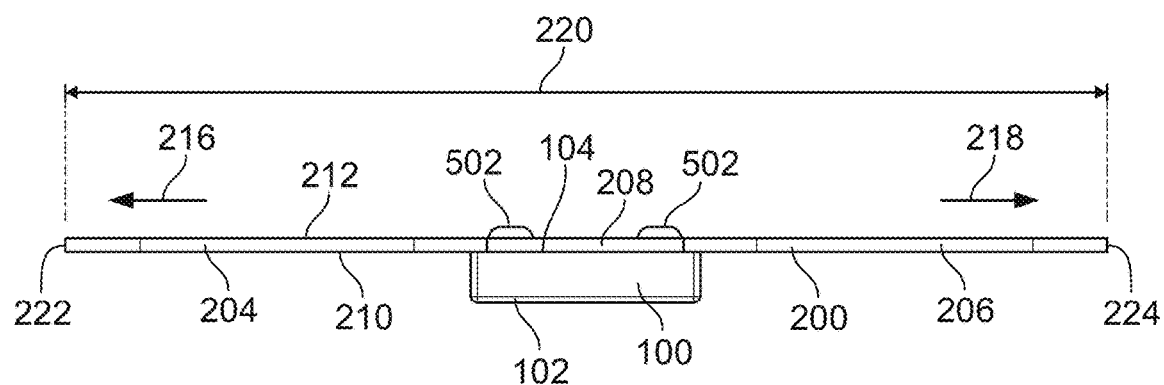
FIG. 5 is a plan view of the first example mounting bracket of FIGS. 2-4 having the example RFID tag of FIG. 1 mounted thereto.
Figure 6:
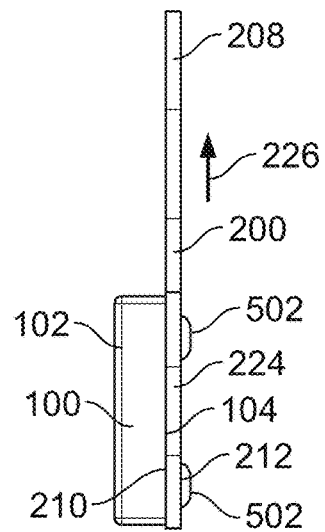
FIG. 6 is a side view of the first example mounting bracket of FIGS. 2-5 having the example RFID tag of FIG. 1 mounted thereto.

FIG. 2 is a perspective view of a first example mounting bracket 200 constructed in accordance with the teachings of this disclosure. FIG. 3 is a perspective view of the first example mounting bracket 200 of FIG. 2 having the example RFID tag 100 of FIG. 1 mounted thereto. FIG. 4 is a front view of the first example mounting bracket 200 of FIGS. 2 and 3 having the example RFID tag 100 of FIG. 1 mounted thereto. FIG. 5 is a plan view of the first example mounting bracket 200 of FIGS. 2-4 having the example RFID tag 100 of FIG. 1 mounted thereto. FIG. 6 is a side view of the first example mounting bracket 200 of FIGS. 2-5 having the example RFID tag 100 of FIG. 1 mounted thereto.

The mounting bracket 200 of FIGS. 2-6 includes an example central portion 202, a first example field amplification arm 204 extending from the central portion 202, a second example field amplification arm 206 extending from the central portion 202, and an example mounting arm 208 extending from the central portion 202. In the illustrated example of FIGS. 2-6, the central portion 202, the first field amplification arm 204, the second field amplification arm 206, the mounting arm 208, and/or, more generally, the mounting bracket 200 has/have an example front surface 210 and an example back surface 212 located opposite the front surface 210.

The central portion 202 of the mounting bracket 200 of FIGS. 2-6 includes example through holes 214 passing from the front surface 210 of the central portion 202 through to the back surface 212 of the central portion 202. Respective ones of the through holes 214 are configured to receive a corresponding fastener to fasten, couple, and/or mount the RFID tag 100 of FIG. 1 to the central portion 202 of the mounting bracket 200. The fastener(s) may include, for example, one or more screw(s), bolt(s), rivet(s), stud(s), boss(es), band(s), cable tie(s), etc. In some examples, the fastener(s) are preferably formed of a metallic material. In the illustrated example of FIGS. 2-6, the central portion 202 of the mounting bracket 200 includes a total of two through holes 214 configured to align with the two through holes 106 of the RFID tag 100 of FIG. 1 described above. In other examples, the central portion 202 of the mounting bracket 200 may include a different number of through holes 214 (e.g., one, three, four, etc.) corresponding in number to a different number of through holes 106 of the RFID tag 100.

As shown in FIGS. 3-6, the RFID tag 100 of FIG. 1 is fastened, coupled, and/or mounted to the mounting bracket 200 of FIGS. 2-6 such that the back surface 104 of the RFID tag 100 faces and/or is in contact with the front surface 210 of the central portion 202 of the mounting bracket 200. As shown in FIGS. 5 and 6, example threaded rivets 502 pass from the back surface 212 of the central portion 202 of the mounting bracket 200, through the through holes 214 of the central portion 202 of the mounting bracket, and into the through holes 106 of the RFID tag 100 to fasten, couple and/or mount the RFID tag 100 to the mounting bracket 200. The threaded rivets 502 may be extracted from the RFID tag 100 and/or the mounting bracket 200 if desired. For example, the threaded rivets 502 may be extracted from the RFID tag 100 and/or the mounting bracket 200 to allow for re-use of the RFID tag 100 and/or the mounting bracket 200.

Fastening, coupling and/or mounting the RFID tag 100 to the mounting bracket 200 via the threaded rivets 502 as shown in FIGS. 5 and 6 advantageously minimizes the parasitic effects that the heads of the threaded rivets 502 may have on the antenna of the RFID tag 100. For example, when located on the back surface 212 of the mounting bracket 200, the heads of the threaded rivets 502 are distanced from the edges of the mounting bracket 200 and advantageously become part of the surface geometry of the mounting bracket 200. Were the heads of the threaded rivets 502 instead located on or near the front surface 102 of the RFID tag 100, the heads of the threaded rivets 502 would be near the active elements of the antenna of the RFID tag 100, potentially resulting in an interaction that may disadvantageously reduce and/or limit the communication range (e.g., the maximum read range) associated with the RFID tag 100.

In the illustrated example of FIGS. 2-6, the central portion 202 of the mounting bracket 200 has a flat, rectangular shape. For example, as shown in FIGS. 2-6, the central portion 202 of the mounting bracket 200 has a length of approximately 32.0 millimeters, a width of approximately 32.0 millimeters, and a thickness of approximately 2.0 millimeters, where the length and width are the dimensions of the front surface 210 of the central portion 202 and the thickness is the dimension between the front surface 210 and the back surface 212 of the central portion 202. In other examples, the central portion 202 of the mounting bracket 200 of FIGS. 2-6 may have a shape and/or dimensions differing from that/those described above. For example, the central portion 202 may have a circular shape, an elliptical shape, a triangular shape, etc., or may have dimensions that are greater than or less than the dimensions described above.

In the illustrated example of FIGS. 2-6, the first field amplification arm 204 of the mounting bracket 200 extends from the central portion 202 of the mounting bracket in a first example direction 216, and the second example field amplification arm 206 of the mounting bracket 200 extends from the central portion 202 of the mounting bracket 200 in a second example direction 218 different from the first direction 216. In the illustrated example of FIGS. 2-6, the second direction 218 is parallel and opposite to the first direction 216. In other examples, the second direction 218 may be different from the first direction 216, but not necessarily parallel and/or opposite to the first direction 216.

The first field amplification arm 204 and the second field amplification arm 206 of the mounting bracket 200 of FIGS. 2-6 respectively have flat, generally rectangular shapes. For example, as shown in FIGS. 2-6, the first field amplification arm 204 of the mounting bracket 200 has a length of approximately 54.0 millimeters, a width of approximately 32.0 millimeters, and a thickness of approximately 2.0 millimeters, where the length and width are the dimensions of the front surface 210 of the first field amplification arm 204 and the thickness is the dimension between the front surface 210 and the back surface 212 of the first field amplification arm 204. The second field amplification arm 206 is similarly shaped and/or dimensioned to have a shape and/or dimensions that match that/those of the first field amplification arm 204. In other examples, the first field amplification arm 204 and/or the second field amplification arm 206 of the mounting bracket 200 of FIGS. 2-6 may have a shape and/or dimensions differing from that/those described above. For example, the first field amplification arm 204 and/or the second field amplification arm 206 may have a circular shape, an elliptical shape, a triangular shape, etc., or may have dimensions that are greater than or less than the dimensions described above.

In the illustrated example of FIGS. 2-6, an example distance 220 between a first example free end 222 of the first field amplification arm 204 and a second example free end 224 of the second field amplification arm 206 is approximately 140.0 millimeters. In other examples, the distance 220 between the first free end 222 of the first field amplification arm 204 and the second free end 224 of the second field amplification arm 206 may range in value from approximately 115.0 millimeters to approximately 165.0 millimeters. In some examples, the distance 220 between the first free end 222 of the first field amplification arm 204 and the second free end 224 of the second field amplification arm 206 preferably does not exceed a distance value equal to one-half of the wavelength of the radio frequency (e.g., a 915 Mhz center frequency) at which the RFID tag 100 of FIG. 1 operates and/or is responsive to.

In the illustrated example of FIGS. 2-6, the first field amplification arm 204 and the second field amplification arm 206 of the mounting bracket 200 amplify an electromagnetic field associated with the RFID tag 100. In response to amplifying the electromagnetic field associated with the RFID tag 100, the first field amplification arm 204 and the second field amplification arm 206 increase the maximum communication range (e.g., the maximum read range) associated with the RFID tag 100. For example, when the RFID tag 100 is mounted to the central portion 202 of the mounting bracket 200 of FIGS. 2-6 as described above, the first field amplification arm 204 and the second field amplification arm 206 of FIGS. 2-6 may increase the maximum communication range (e.g., the maximum read range) associated with the RFID tag 100 by a distance of ten feet or more. In such examples, the maximum communication range associated with the mounted RFID tag 100 may be fifteen feet or more (e.g., twenty feet, twenty-five feet, etc.) at a center frequency of 915 MHz, in comparison to the maximum communication range of the RFID tag 100 in isolation (e.g., not mounted to the mounting bracket 200 of FIGS. 2-6) being just five feet or less at a center frequency of 915 MHz. In some examples, one or more reflector(s) and/or director(s) may be added to the mounting bracket 200 of FIGS. 2-6 to further enhance and/or increase the maximum communication range associated with the RFID tag 100.

In the illustrated example of FIGS. 2-6, the mounting arm 208 of the mounting bracket 200 extends from the central portion 202 of the mounting bracket in a third example direction 226 different from the first direction 216 and the second direction 218. In the illustrated example of FIGS. 2-6, the third direction 226 is perpendicular to the first direction 216 and to the second direction 218. In other examples, the third direction 226 may be different from the first direction 216 and the second direction 218, but not necessarily perpendicular to the first direction 216 and/or to the second direction 218.

The mounting arm 208 of the mounting bracket 200 of FIGS. 2-6 includes an example through hole 228 passing from the front surface 210 of the mounting arm 208 through to the back surface 212 of the mounting arm 208. The through hole 228 is configured to receive a fastener (not shown) to fasten, couple, and/or mount the mounting bracket 200 of FIGS. 2-6 to an object (e.g., a field device). The fastener may include, for example, a screw, a bolt, a rivet, a stud, a boss, a band, a cable tie, etc. In some examples, the fastener is preferably formed of a metallic material. In the illustrated example of FIGS. 2-6, the mounting arm 208 of the mounting bracket 200 includes a single through hole 228. In other examples, the mounting arm 208 of the mounting bracket 200 may include a different number of through holes 228 (e.g., two, three, four, etc.).

The mounting arm 208 of the mounting bracket 200 of FIGS. 2-6 has a flat, generally rounded shape. For example, as shown in FIGS. 2-6, the mounting arm 208 of the mounting bracket 200 has a length of approximately 38.0 millimeters, a width of approximately 26.4 millimeters, and a thickness of approximately 2.0 millimeters, where the length and width are the dimensions of the front surface 210 of the mounting arm 208 and the thickness is the dimension between the front surface 210 and the back surface 212 of the mounting arm 208. In other examples, the mounting arm 208 of the mounting bracket 200 of FIGS. 2-6 may have a shape and/or dimensions differing from that/those described above. For example, the mounting arm 208 may have an elliptical shape, a triangular shape, a rectangular shape, etc., or may have dimensions that are greater than or less than the dimensions described above.

In the illustrated example of FIGS. 2-6, the central portion 202, the first field amplification arm 204, the second field amplification arm 206, and the mounting arm 208 of the mounting bracket 200 are coplanar. In other examples, one or more of the first field amplification arm 204, the second field amplification arm 206, and/or the mounting arm 208 of the mounting bracket 200 FIGS. 2-6 may be at an angle relative to the central portion 202 of the mounting bracket 200 of FIGS. 2-6 such that the first field amplification arm 204, the second field amplification arm 206, and/or the mounting arm 208 is/are not coplanar with the central portion 202.

Figure 7:
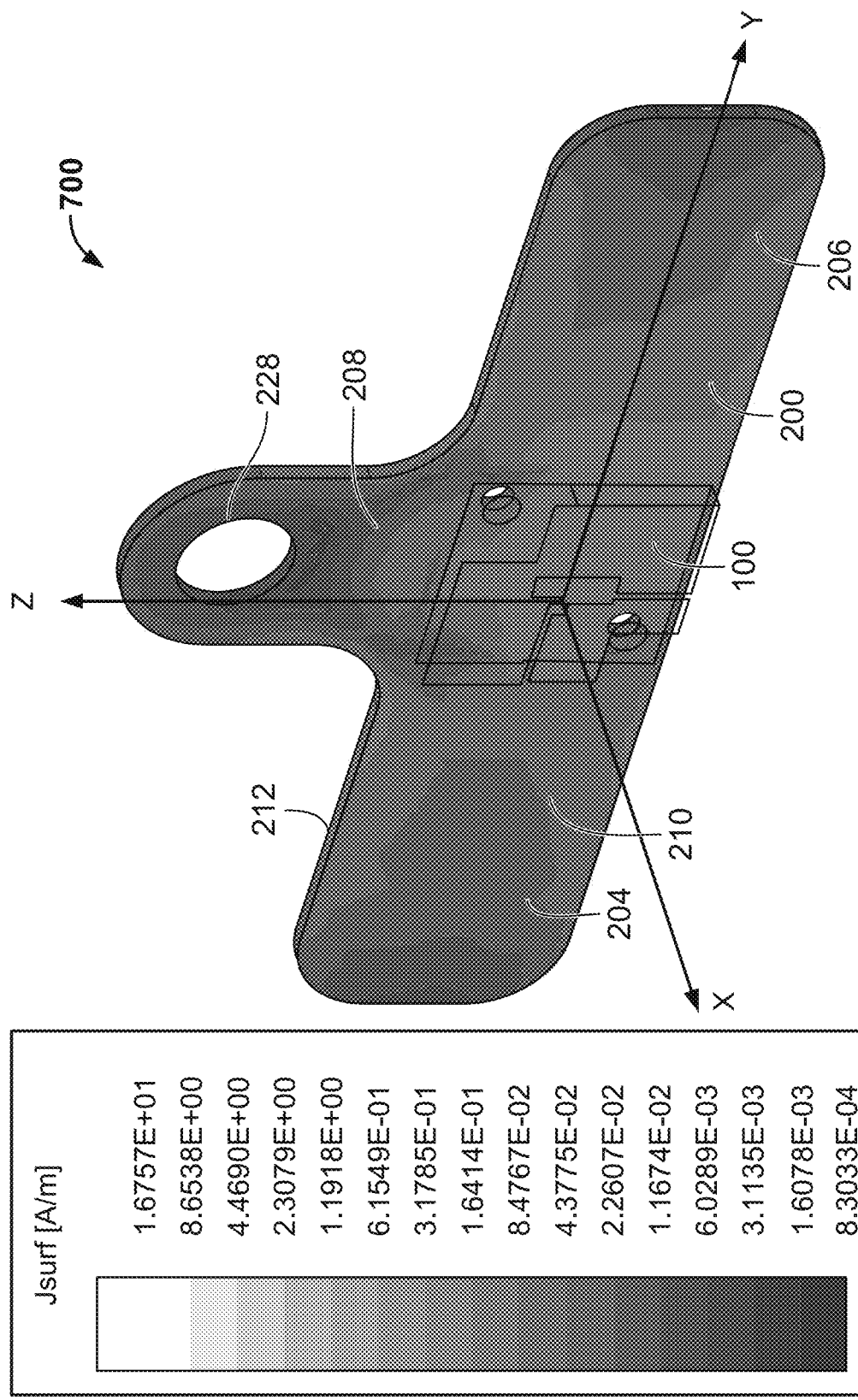
FIG. 7 is an example surface current density profile for the first example mounting bracket of FIGS. 2-6 having the example RFID tag of FIG. 1 mounted thereto.

FIG. 7 is an example surface current density profile 700 for the first example mounting bracket 200 of FIGS. 2-6 having the example RFID tag 100 of FIG. 1 mounted thereto. The surface current density profile 700 of FIG. 7 shows the surface current density for the mounting bracket 200 of FIGS. 2-6 at a center frequency of 915 MHz. As shown in FIG. 7, the mounting bracket 200 acts as an antenna and/or resonator for the RFID tag 100 with a majority of the resonant behavior occurring along the edges of the first field amplification arm 204 and the second field amplification arm 206 of the mounting bracket 200. In some examples, the geometry of the mounting bracket 200 of FIGS. 2-6 may be modified (e.g., relative to the example geometry and/or example dimensions described above) to further concentrate the current densities along the edges of the first field amplification arm 204 and the second field amplification arm 206 of the mounting bracket 200.

As further shown in FIG. 7, current densities near the through hole 228 of the mounting arm 208 of the mounting bracket 200 are largely quiescent. The through hole 228 may accordingly receive a metallic fastener to fasten, couple, and/or mount the mounting bracket 200 to an object (e.g., a field device). However, the edges of the first field amplification arm 204 and the second field amplification arm 206 of the mounting bracket 200 are sensitive to mounting considerations, and should accordingly remain in free space (e.g., free of contact with other metallic surfaces). For example, tack welding, banding, or otherwise directly coupling the first field amplification arm 204 (e.g., the first free end 222 of the first field amplification arm 204) and/or the second field amplification arm 206 (e.g., the second free end 224 of the second field amplification arm 206) of the mounting bracket 200 to another metallic surface (e.g., a metal casing of an actuator) may detune the mounting bracket 200 and/or otherwise undermine the electromagnetic field strength amplification benefits provided by the mounting bracket 200. In some examples, one or more additional through hole(s) may be formed in one or more electrically quiescent region(s) of the mounting bracket 200. For example, one or more additional through hole(s) may be formed in one or more of an area surrounding the through hole 228 of the mounting arm 200, an area proximate the first free end 222 of the first field amplification arm 204, an area proximate the second free end 224 of the second field amplification arm 206, etc.

Figure 8:
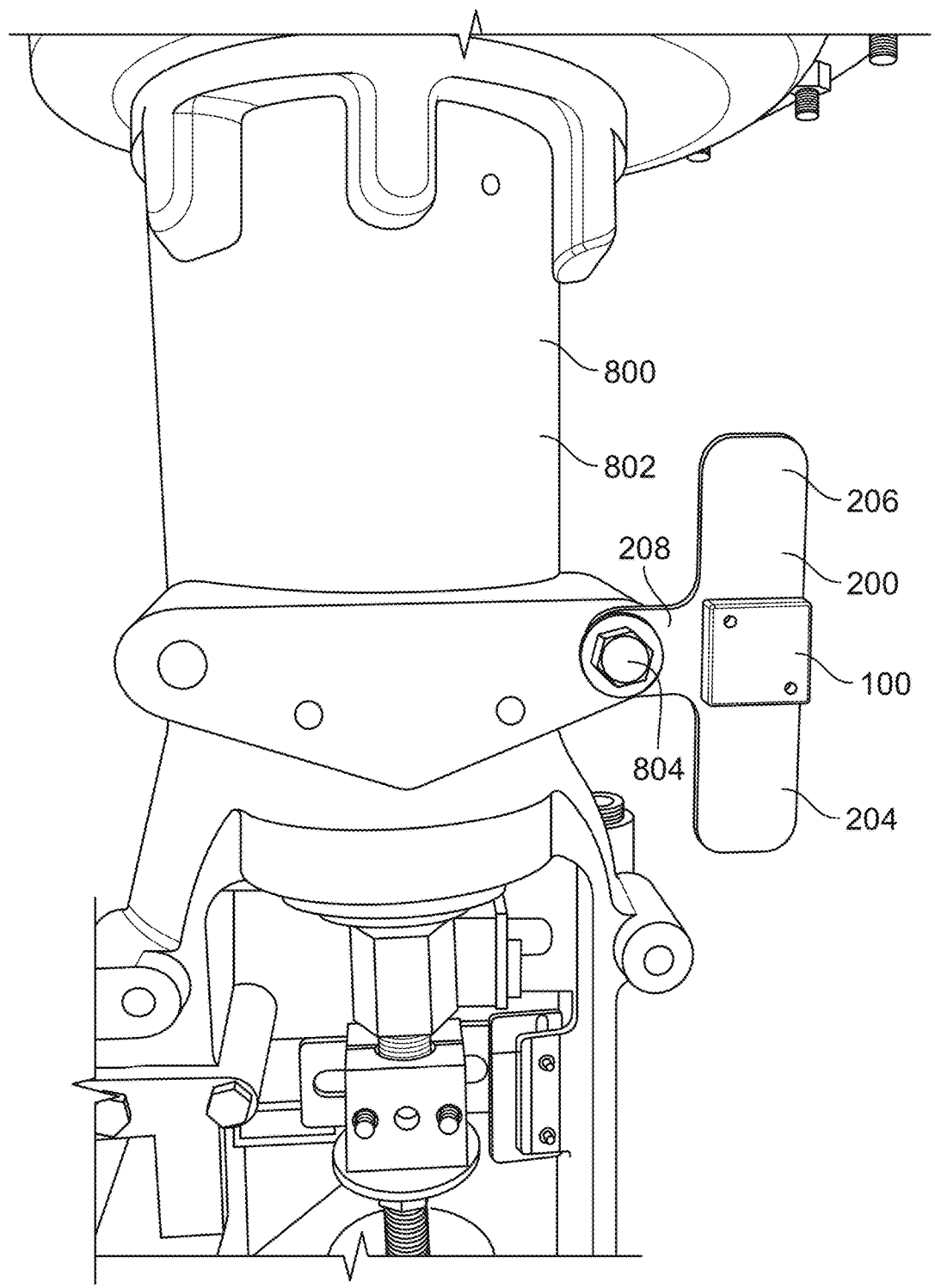
FIG. 8 illustrates the first example mounting bracket of FIGS. 2-6 mounted to an example object.

FIG. 8 illustrates the first example mounting bracket 200 of FIGS. 2-6 mounted to an example object 800. In the illustrated example of FIG. 8, the object 800 is an actuator having an example metallic casing 802. An example metallic fastener 804 passes through the through hole 228 of the mounting arm 208 of the mounting bracket 200 of FIGS. 2-6 described above to fasten, couple, and/or mount the mounting bracket 200 to the metallic casing 802 of the object 800. When the mounting bracket 200 is positioned and/or mounted as shown in FIG. 7 (e.g., positioned and/or mounted in free space), the RFID tag 100 fastened, coupled, and/or mounted to the mounting bracket 200 may advantageously be read from the front surface 102 of the RFID tag 100 and/or the front surface 210 of the mounting bracket 200, as well as from the back surface 104 of the RFID tag 100 and/or the back surface 212 of the mounting bracket 200.

Figure 9:
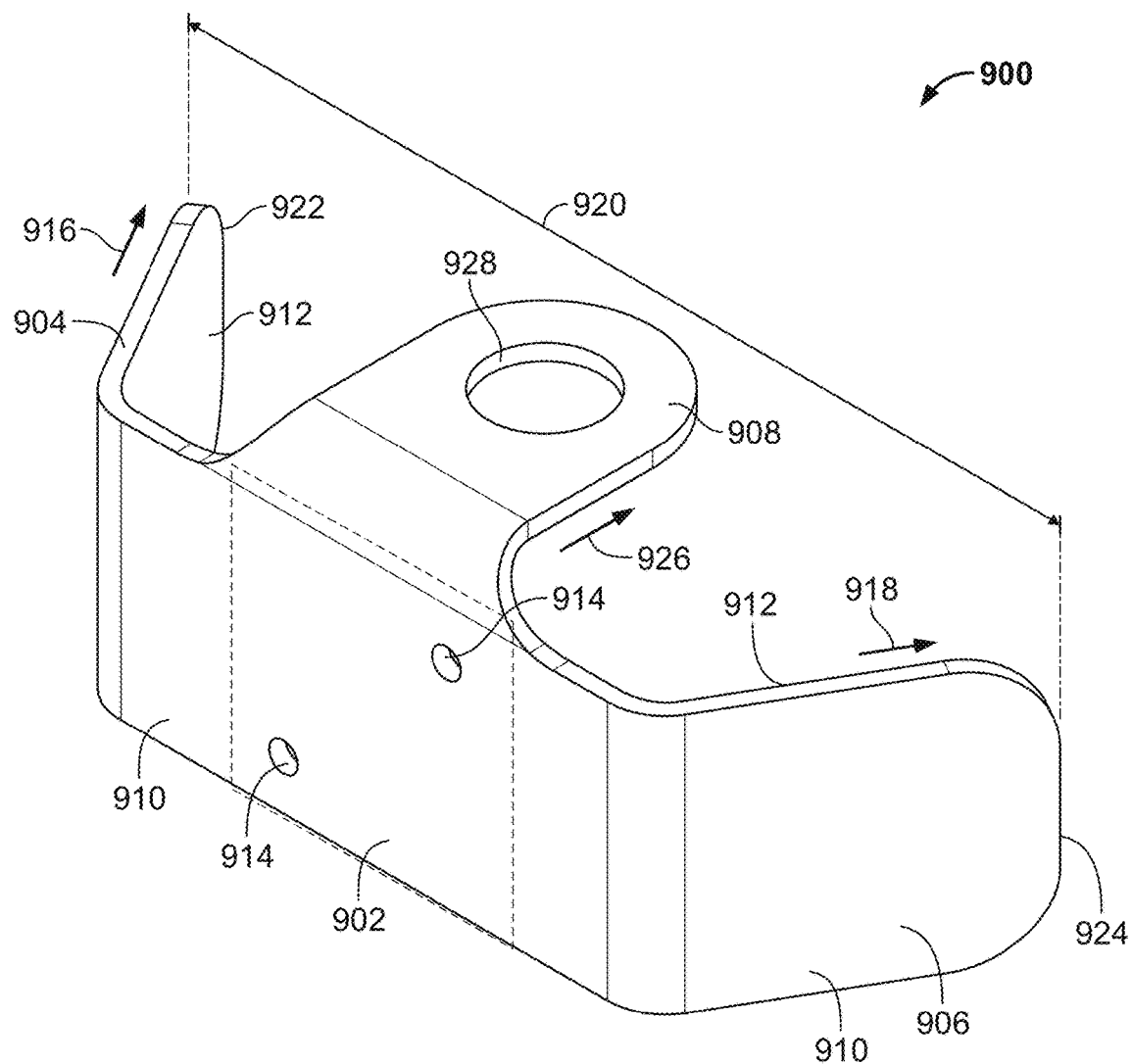
FIG. 9 is a perspective view of a second example mounting bracket constructed in accordance with the teachings of this disclosure.
Figure 10:
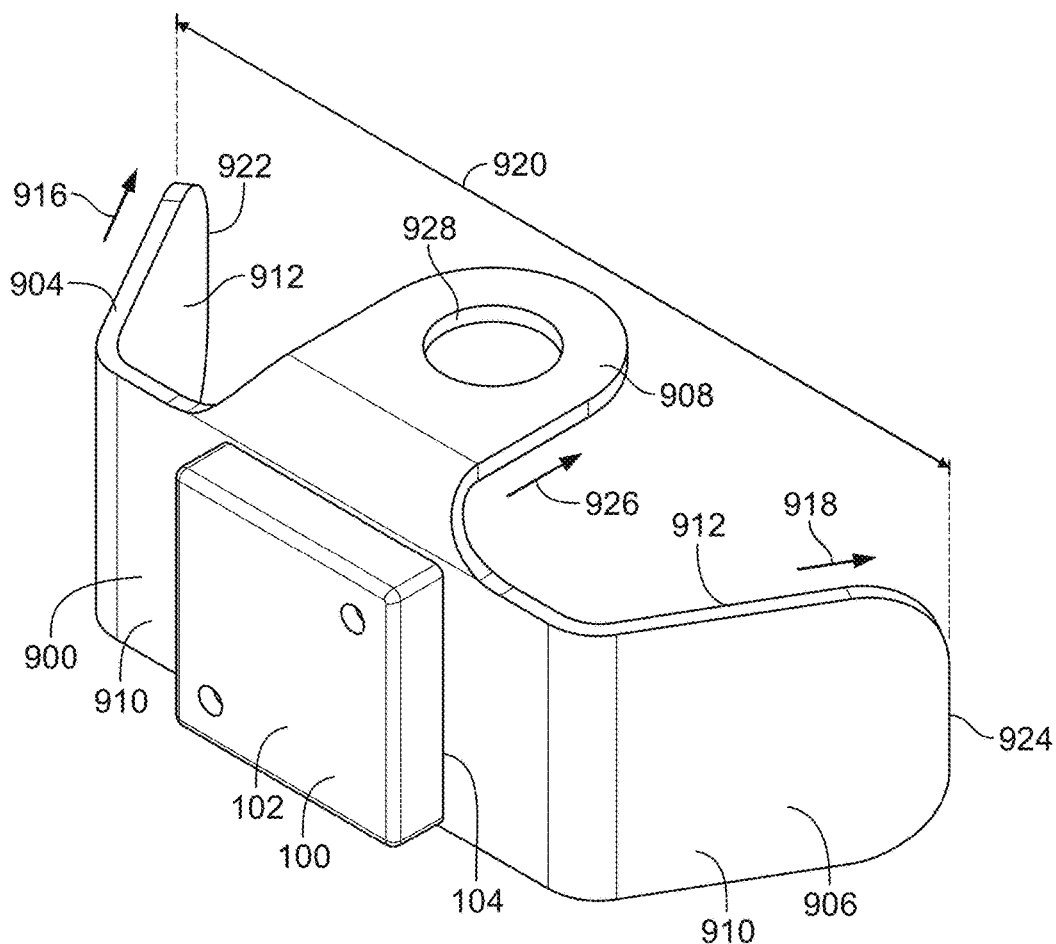
FIG. 10 is a perspective view of the second example mounting bracket of FIG. 9 having the example RFID tag of FIG. 1 mounted thereto.
Figure 11:
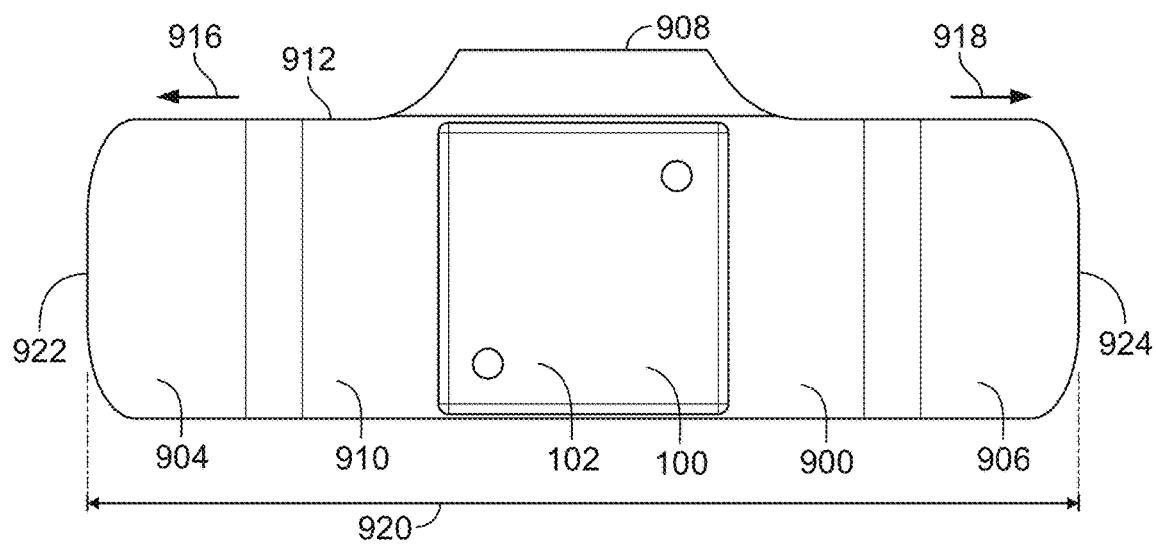
FIG. 11 is a front view of the second example mounting bracket of FIGS. 9 and 10 having the example RFID tag of FIG. 1 mounted thereto.
Figure 12:
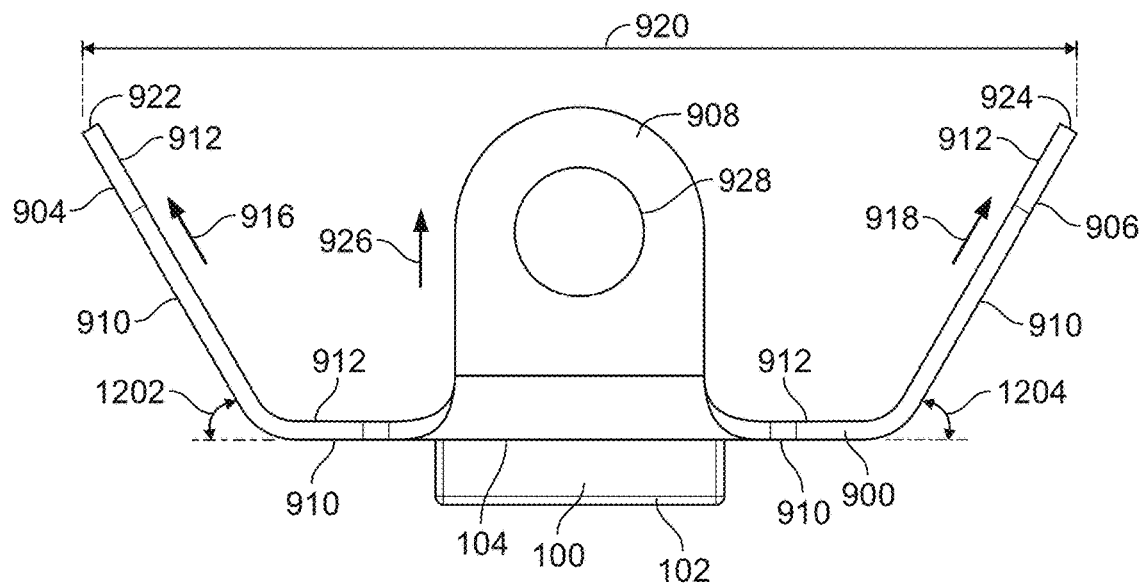
FIG. 12 is a plan view of the second example mounting bracket of FIGS. 9-11 having the example RFID tag of FIG. 1 mounted thereto.
Figure 13:
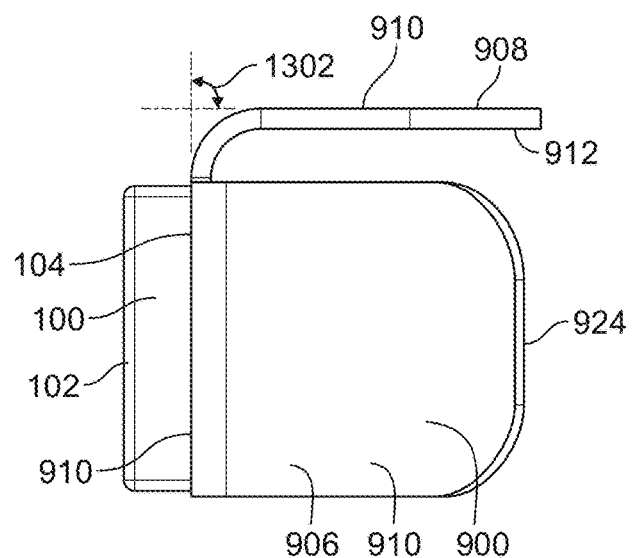
FIG. 13 is a side view of the second example mounting bracket of FIGS. 9-12 having the example RFID tag of FIG. 1 mounted thereto.

FIG. 9 is a perspective view of a second example mounting bracket 900 constructed in accordance with the teachings of this disclosure. FIG. 10 is a perspective view of the second example mounting bracket 900 of FIG. 9 having the example RFID tag 100 of FIG. 1 mounted thereto. FIG. 11 is a front view of the second example mounting bracket 900 of FIGS. 9 and 10 having the example RFID tag 100 of FIG. 1 mounted thereto. FIG. 12 is a plan view of the second example mounting bracket 900 of FIGS. 9-11 having the example RFID tag of FIG. 1 mounted thereto. FIG. 13 is a side view of the second example mounting bracket 900 of FIGS. 9-12 having the example RFID tag 100 of FIG. 1 mounted thereto.

The mounting bracket 900 of FIGS. 9-13 includes an example central portion 902, a first example field amplification arm 904 extending from the central portion 902, a second example field amplification arm 906 extending from the central portion 902, and an example mounting arm 908 extending from the central portion 902. In the illustrated example of FIGS. 9-13, the central portion 902, the first field amplification arm 904, the second field amplification arm 906, the mounting arm 908, and/or, more generally, the mounting bracket 900 has/have an example outer surface 910 and an example inner surface 912 located opposite the outer surface 910.

The central portion 902 of the mounting bracket 900 of FIGS. 9-13 includes example through holes 914 passing from the outer surface 910 of the central portion 902 through to the inner surface 912 of the central portion 902. Respective ones of the through holes 914 are configured to receive a corresponding fastener (not shown) to fasten, couple, and/or mount the RFID tag 100 of FIG. 1 to the central portion 902 of the mounting bracket 900. The fastener(s) may include, for example, one or more screw(s), bolt(s), rivet(s), stud(s), boss(es), band(s), cable tie(s), etc. In some examples, the fastener(s) are preferably formed of a metallic material. In the illustrated example of FIGS. 9-13, the central portion 902 of the mounting bracket 900 includes a total of two through holes 914 configured to align with the two through holes 106 of the RFID tag 100 of FIG. 1 described above. In other examples, the central portion 902 of the mounting bracket 900 may include a different number of through holes 914 (e.g., one, three, four, etc.) corresponding in number to a different number of through holes 106 of the RFID tag 100. As shown in FIGS. 10-13, the RFID tag 100 of FIG. 1 is fastened, coupled, and/or mounted to the mounting bracket 900 of FIGS. 9-13 such that the back surface 104 of the RFID tag 100 faces and/or is in contact with the outer surface 910 of the central portion 902 of the mounting bracket 900.

In the illustrated example of FIGS. 9-13, the central portion 902 of the mounting bracket 900 has a flat, rectangular shape. For example, as shown in FIGS. 9-13, the central portion 902 of the mounting bracket 900 has a length of approximately 32.0 millimeters, a width of approximately 32.0 millimeters, and a thickness of approximately 2.0 millimeters, where the length and width are the dimensions of the outer surface 910 of the central portion 902 and the thickness is the dimension between the outer surface 910 and the inner surface 912 of the central portion 902. In other examples, the central portion 902 of the mounting bracket 900 of FIGS. 9-13 may have a shape and/or dimensions differing from that/those described above. For example, the central portion 902 may have a circular shape, an elliptical shape, a triangular shape, etc., or may have dimensions that are greater than or less than the dimensions described above.

In the illustrated example of FIGS. 9-13, the first field amplification arm 904 of the mounting bracket 900 extends from the central portion 902 of the mounting bracket in a first example direction 916, and the second example field amplification arm 906 of the mounting bracket 900 extends from the central portion 902 of the mounting bracket 900 in a second example direction 918 different from the first direction 916. In the illustrated example of FIGS. 9-13, the second direction 918 lies at an angle relative to the first direction 216, as further described below.

The first field amplification arm 904 and the second field amplification arm 906 of the mounting bracket 900 of FIGS. 9-13 respectively have flat, generally rectangular shapes. For example, as shown in FIGS. 9-13, the first field amplification arm 904 of the mounting bracket 900 has a length of approximately 54.0 millimeters (14.0 millimeters from the central portion 902 to the bend formed in the first field amplification arm 904, and 40.0 millimeters from the bend to the free end of the first field amplification arm 904), a width of approximately 32.0 millimeters, and a thickness of approximately 2.0 millimeters, where the length and width are the dimensions of the outer surface 910 of the first field amplification arm 904 and the thickness is the dimension between the outer surface 910 and the inner surface 912 of the first field amplification arm 904. The second field amplification arm 906 is similarly shaped and/or dimensioned to have a shape and/or dimensions that match that/those of the first field amplification arm 904. In other examples, the first field amplification arm 904 and/or the second field amplification arm 906 of the mounting bracket 900 of FIGS. 9-13 may have a shape and/or dimensions differing from that/those described above. For example, the first field amplification arm 904 and/or the second field amplification arm 906 may have a circular shape, an elliptical shape, a triangular shape, etc., or may have dimensions that are greater than or less than the dimensions described above.

In the illustrated example of FIGS. 9-13, an example distance 920 between a first example free end 922 of the first field amplification arm 904 and a second example free end 924 of the second field amplification arm 906 is approximately 103.0 millimeters. In other examples, the distance 920 between the first free end 922 of the first field amplification arm 904 and the second free end 924 of the second field amplification arm 906 may range in value from approximately 60.0 millimeters to approximately 140.0 millimeters.

In the illustrated example of FIGS. 9-13, the first field amplification arm 904 and the second field amplification arm 906 of the mounting bracket 900 amplify an electromagnetic field associated with the RFID tag 100. In response to amplifying the electromagnetic field associated with the RFID tag 100, the first field amplification arm 904 and the second field amplification arm 906 increase the maximum communication range (e.g., the maximum read range) associated with the RFID tag 100. For example, when the RFID tag 100 is mounted to the central portion 902 of the mounting bracket 900 of FIGS. 9-13 as described above, the first field amplification arm 904 and the second field amplification arm 906 of FIGS. 9-13 may increase the maximum communication range (e.g., the maximum read range) associated with the RFID tag 100 by a distance of ten feet or more. In such examples, the maximum communication range associated with the mounted RFID tag 100 may be fifteen feet or more (e.g., twenty feet, twenty-five feet, etc.) at a center frequency of 915 MHz, in comparison to the maximum communication range of the RFID tag 100 in isolation (e.g., not mounted to the mounting bracket 900 of FIGS. 9-13) being just five feet or less at a center frequency of 915 MHz. In some examples, one or more reflector(s) and/or director(s) may be added to the mounting bracket 900 of FIGS. 9-13 to further enhance and/or increase the maximum communication range associated with the RFID tag 100.

In the illustrated example of FIGS. 9-13, the mounting arm 908 of the mounting bracket 900 extends from the central portion 902 of the mounting bracket in a third example direction 926 different from the first direction 916 and the second direction 918. In the illustrated example of FIGS. 9-13, the third direction 226 lies at an angle relative to the first direction 216 and to the second direction 218, as further described below.

The mounting arm 908 of the mounting bracket 900 of FIGS. 9-13 includes an example through hole 928 passing from the outer surface 910 of the mounting arm 908 through to the inner surface 912 of the mounting arm 908. The through hole 928 is configured to receive a fastener (not shown) to fasten, couple, and/or mount the mounting bracket 900 of FIGS. 9-13 to an object (e.g., a field device). The fastener may include, for example, a screw, a bolt, a rivet, a stud, a boss, a band, a cable tie, etc. In some examples, the fastener is preferably formed of a metallic material. In the illustrated example of FIGS. 9-13, the mounting arm 908 of the mounting bracket 900 includes a single through hole 928. In other examples, the mounting arm 908 of the mounting bracket 900 may include a different number of through holes 928 (e.g., two, three, four, etc.).

The mounting arm 908 of the mounting bracket 900 of FIGS. 9-13 has a flat, generally rounded shape. For example, as shown in FIGS. 9-13, the mounting arm 908 of the mounting bracket 900 has a length of approximately 33.0 millimeters (38.0 millimeters including the bend), a width of approximately 26.4 millimeters, and a thickness of approximately 2.0 millimeters, where the length and width are the dimensions of the outer surface 910 of the mounting arm 908 and the thickness is the dimension between the outer surface 910 and the inner surface 912 of the mounting arm 908. In other examples, the mounting arm 908 of the mounting bracket 900 of FIGS. 9-13 may have a shape and/or dimensions differing from that/those described above. For example, the mounting arm 908 may have an elliptical shape, a triangular shape, a rectangular shape, etc., or may have dimensions that are greater than or less than the dimensions described above.

In the illustrated example of FIGS. 9-13, none of the first field amplification arm 904, the second field amplification arm 906, and/or the mounting arm 908 of the mounting bracket 900 are coplanar relative to the central portion 902 of the mounting bracket 900. For example, as shown in FIGS. 9-13, the first field amplification arm 904 is bent and/or positioned at a first example angle 1202 relative to the central portion 902 of the mounting bracket 900. In the illustrated example of FIGS. 9-13, the first angle 1202 is approximately sixty degrees (60°). In other examples, the first angle 1202 may range in value from approximately negative ninety degrees (−90°) (e.g., bent forward) to approximately ninety degrees (90°) (e.g., bent backward). The second field amplification arm 906 of FIGS. 9-13 is bent and/or positioned at a second example angle 1204 relative to the central portion 902 of the mounting bracket 900. In the illustrated example of FIGS. 9-13, the second angle 1204 is approximately sixty degrees (60°). In other examples, the second angle 1204 may range in value from approximately negative ninety degrees (−90°) (e.g., bent forward) to approximately ninety degrees (90°) (e.g., bent backward). The mounting arm 908 of FIGS. 9-13 is bent and/or positioned at a third example angle 1302 relative to the central portion 902 of the mounting bracket 900. In the illustrated example of FIGS. 9-13, the third angle 1302 is approximately ninety degrees (90°). In other examples, the third angle 1302 may range in value from approximately negative ninety degrees (−90°) (e.g., bent forward) to approximately ninety degrees (90°) (e.g., bent backward).

Bending and/or positioning the first field amplification arm 904, the second field amplification arm 906, and/or the mounting arm 908 of the mounting bracket 900 relative to the central portion 902 of the mounting bracket 900 as shown in FIGS. 9-13 advantageously minimizes the profile of the mounting bracket 900 as a whole. Bending and/or positioning the first field amplification arm 904, the second field amplification arm 906, and/or the mounting arm 908 of the mounting bracket 900 relative to the central portion 902 of the mounting bracket 900 as shown in FIGS. 9-13 also advantageously reduces the likelihood of any one of the first field amplification arm 904, the second field amplification arm 906, and/or the mounting arm 908 of the mounting bracket 900 being snagged and/or caught by a cable and/or conduit of an object (e.g., a field device) to which the mounting bracket 900 may be fastened, coupled, and/or mounted, or by a human interacting with such an object.

Figure 14:
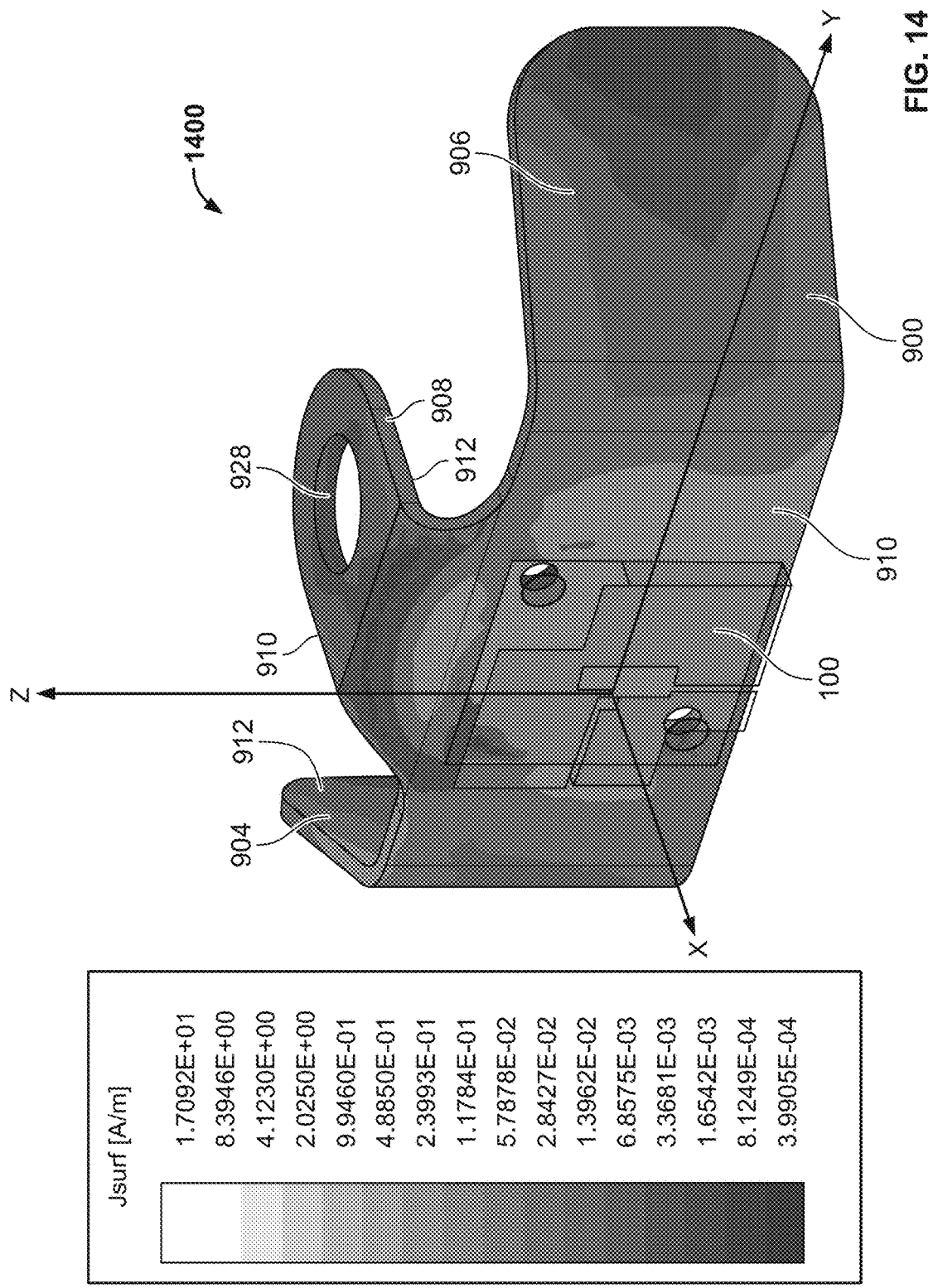
FIG. 14 is an example surface current density profile for the second example mounting bracket of FIGS. 9-13 having the example RFID tag of FIG. 1 mounted thereto.

FIG. 14 is an example surface current density profile 1400 for the second example mounting bracket 900 of FIGS. 9-13 having the example RFID tag 100 of FIG. 1 mounted thereto. The surface current density profile 1400 of FIG. 14 shows the surface current density for the mounting bracket 900 of FIGS. 9-13 at a center frequency of 915 MHz. As shown in FIG. 14, the mounting bracket 900 acts as an antenna and/or resonator for the RFID tag 100 with a majority of the resonant behavior occurring along the edges of the first field amplification arm 904 and the second field amplification arm 906 of the mounting bracket 900. In some examples, the geometry of the mounting bracket 900 of FIGS. 9-13 may be modified (e.g., relative to the example geometry and/or example dimensions described above) to further concentrate the current densities along the edges of the first field amplification arm 904 and the second field amplification arm 906 of the mounting bracket 900.

As further shown in FIG. 14, current densities near the through hole 928 of the mounting arm 908 of the mounting bracket 900 are largely quiescent. The through hole 928 may accordingly receive a metallic fastener to fasten, couple, and/or mount the mounting bracket 900 to an object (e.g., a field device). However, the edges of the first field amplification arm 904 and the second field amplification arm 906 of the mounting bracket 900 are sensitive to mounting considerations, and should accordingly remain in free space (e.g., free of contact with other metallic surfaces). For example, tack welding, banding, or otherwise directly coupling the first field amplification arm 904 (e.g., the first free end 922 of the first field amplification arm 904) and/or the second field amplification arm 906 (e.g., the second free end 924 of the second field amplification arm 906) of the mounting bracket 900 to another metallic surface (e.g., a metal casing of an actuator) may detune the mounting bracket 900 and/or otherwise undermine the electromagnetic field strength amplification benefits provided by the mounting bracket 900. In some examples, one or more additional through hole(s) may be formed in one or more electrically quiescent region(s) of the mounting bracket 900. For example, one or more additional through hole(s) may be formed in one or more of an area surrounding the through hole 928 of the mounting arm 908, an area proximate the first free end 922 of the first field amplification arm 904, an area proximate the second free end 924 of the second field amplification arm 906, etc.

Figure 15:
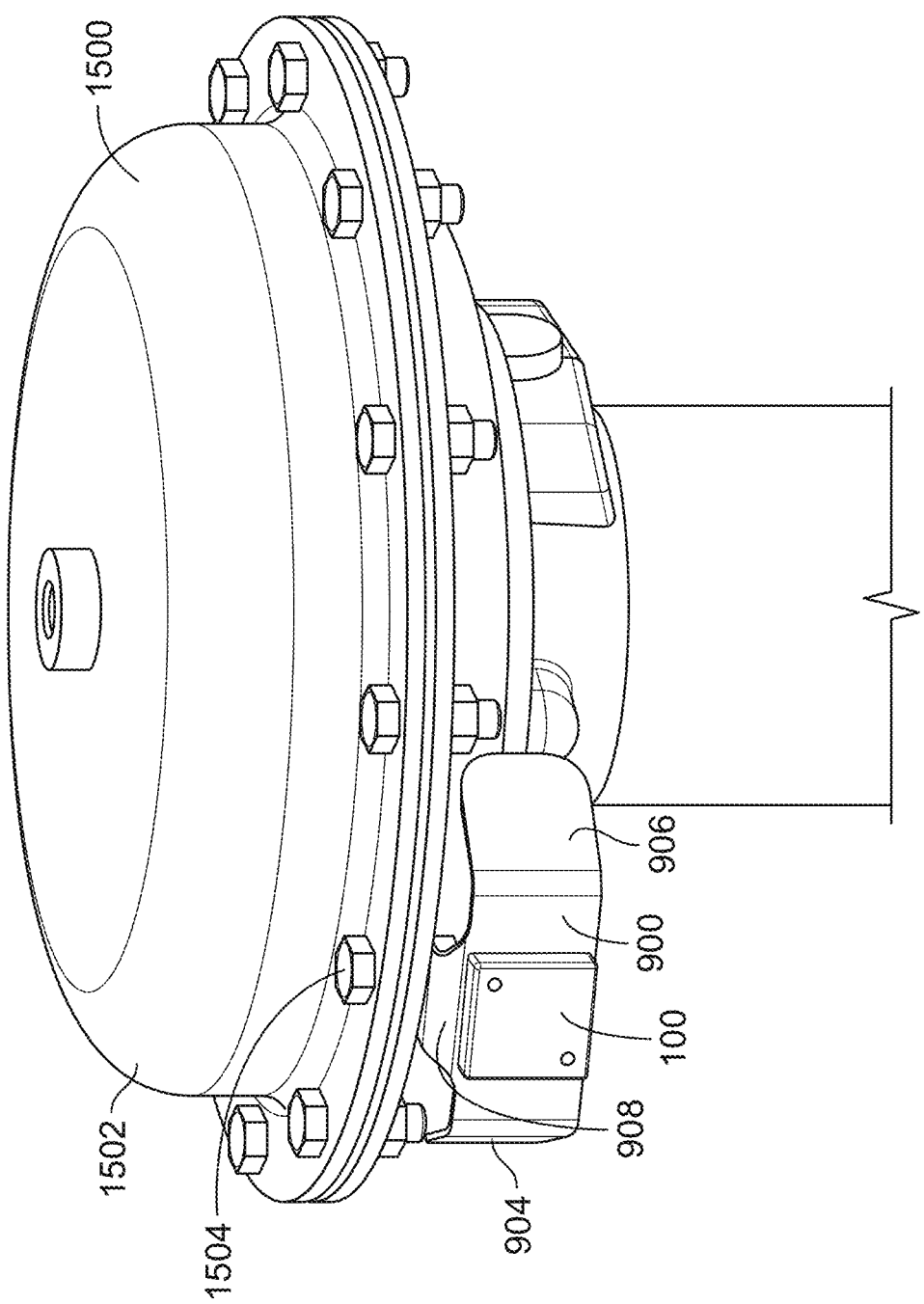
FIG. 15 illustrates the second example mounting bracket of FIGS. 9-13 mounted to an example object.

FIG. 15 illustrates the second example mounting bracket 900 of FIGS. 9-13 mounted to an example object 1500. In the illustrated example of FIG. 15, the object 1500 is an actuator having an example metallic casing 1502. An example metallic fastener 1504 passes through the through hole 928 of the mounting arm 908 of the mounting bracket 900 of FIGS. 9-13 described above to fasten, couple, and/or mount the mounting bracket 900 to the metallic casing 1502 of the object 1500. When the mounting bracket 900 is positioned and/or mounted as shown in FIG. 15 (e.g., not positioned and/or mounted in free space), the RFID tag 100 fastened, coupled, and/or mounted to the mounting bracket 900 may be read from the front surface 102 of the RFID tag 100 and/or the outer surface 910 of the mounting bracket 900, but may be unreadable and/or have a very limited read range from the back surface 104 of the RFID tag 100 and/or the inner surface 912 of the mounting bracket 900.

Figure 16:
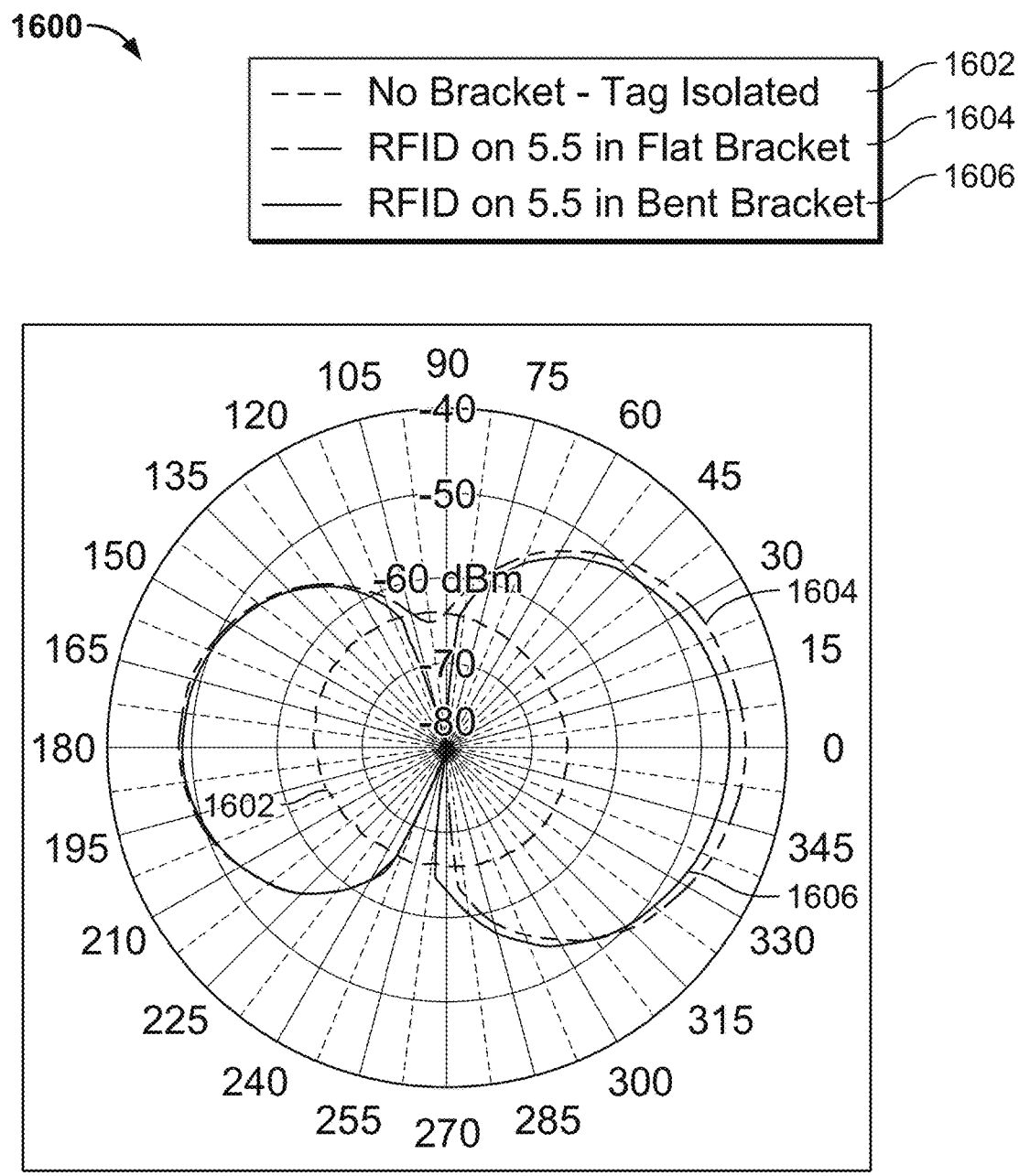
FIG. 16 is an example graph of received signal strength associated with the example RFID tag of FIG. 1 as a function of azimuthal angle.

FIG. 16 is an example graph 1600 of received signal strength associated with the example RFID tag 100 of FIG. 1 as a function of azimuthal angle. The graph 1600 of FIG. 16 includes a first example plot 1602 corresponding to the example RFID tag 100 of FIG. 1 in isolation. The graph 1600 of FIG. 16 also includes a second example plot 1604 corresponding to the example RFID tag 100 of FIG. 1 mounted to the first example mounting bracket 200 of FIG. 2, as shown in FIGS. 3-6. The graph 1600 of FIG. 16 also includes a third example plot 1606 corresponding to the example RFID tag 100 of FIG. 1 mounted to the second example mounting bracket 900 of FIG. 2, as shown in FIGS. 10-13. In the illustrated example of FIG. 16, an azimuthal angle of zero degrees (0°) corresponds to the front surface 102 of the RFID tag 100 of FIG. 1, and an azimuthal angle of one hundred eighty degrees (180°) corresponds to the back surface 104 of the RFID tag 100 of FIG. 1.

As shown in the first plot 1602 of the graph 1600 of FIG. 16, the maximum received signal strength associated with the example RFID tag 100 of FIG. 1 in isolation is approximately −65 dBm at both the front surface 102 (e.g., at 0°) and the back surface (e.g., 180°) of the RFID tag 100. By comparison, the second plot 1604 of the graph 1600 of FIG. 16 shows that the maximum received signal strength associated with the example RFID tag 100 of FIG. 1 mounted to the first example mounting bracket 200 of FIG. 2 is approximately −45 dBm at the front surface 102 (e.g., at 0°) of the RFID tag 100, and approximately −49 dBm at the back surface (e.g., 180°) of the RFID tag 100. By further comparison, the third plot 1606 of the graph 1600 of FIG. 16 shows that the maximum received signal strength associated with the example RFID tag 100 of FIG. 1 mounted to the second example mounting bracket 900 of FIG. 9 is approximately −47 dBm at the front surface 102 (e.g., at) 0° of the RFID tag 100, and approximately −49 dBm at the back surface (e.g., 180°) of the RFID tag 100. Thus, the maximum received signal strength associated with the RFID tag 100 of FIG. 1 increases substantially in response to the RFID tag 100 being mounted to either the first mounting bracket 200 of FIG. 2 or to the second mounting bracket 900 of FIG. 9.

Figure 17:
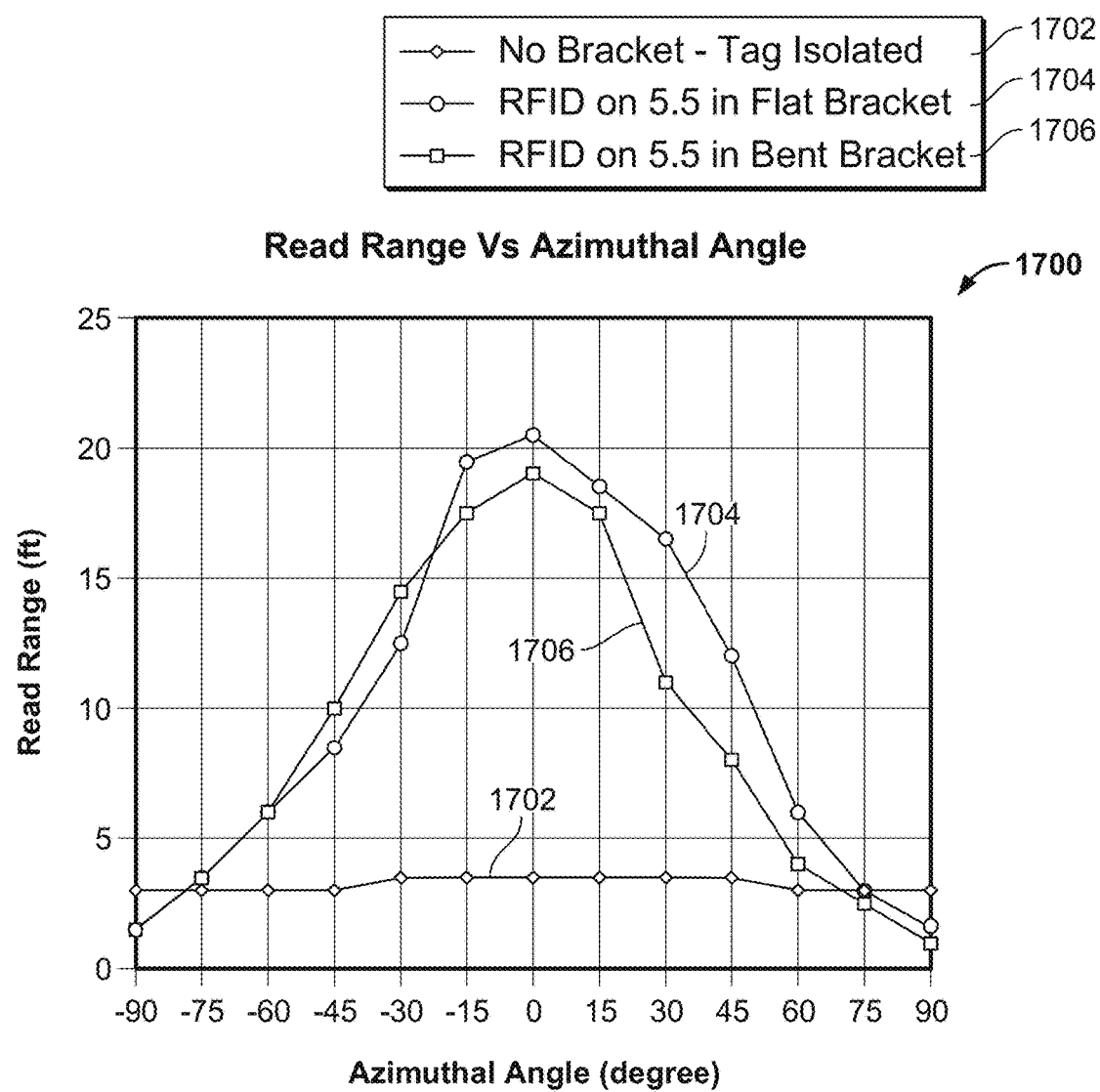
FIG. 17 is an example graph of read range associated with the example RFID tag of FIG. 1 as a function of azimuthal angle.

FIG. 17 is an example graph 1700 of read range associated with the example RFID tag 100 of FIG. 1 as a function of azimuthal angle. The graph 1700 of FIG. 17 includes a first example plot 1702 corresponding to the example RFID tag 100 of FIG. 1 in isolation. The graph 1700 of FIG. 17 also includes a second example plot 1704 corresponding to the example RFID tag 100 of FIG. 1 mounted to the first example mounting bracket 200 of FIG. 2, as shown in FIGS. 3-6. The graph 1700 of FIG. 17 also includes a third example plot 1706 corresponding to the example RFID tag 100 of FIG. 1 mounted to the second example mounting bracket 900 of FIG. 2, as shown in FIGS. 10-13. In the illustrated example of FIG. 17, an azimuthal angle of zero degrees (0°) corresponds to the front surface 102 of the RFID tag 100 of FIG. 1.

As shown in the first plot 1702 of the graph 1700 of FIG. 17, the maximum read range associated with the example RFID tag 100 of FIG. 1 in isolation is approximately four feet at the front surface 102 (e.g., at 0°) of the RFID tag 100. By comparison, the second plot 1704 of the graph 1700 of FIG. 17 shows that the maximum read range associated with the example RFID tag 100 of FIG. 1 mounted to the first example mounting bracket 200 of FIG. 2 is approximately twenty feet at the front surface 102 (e.g., at 0°) of the RFID tag 100. By further comparison, the third plot 1706 of the graph 1700 of FIG. 17 shows that the maximum read range associated with the example RFID tag 100 of FIG. 1 mounted to the second example mounting bracket 900 of FIG. 9 is approximately eighteen feet at the front surface 102 (e.g., at 0°) of the RFID tag 100. Thus, the maximum read range associated with the RFID tag 100 of FIG. 1 increases substantially in response to the RFID tag 100 being mounted to either the first mounting bracket 200 of FIG. 2 or to the second mounting bracket 900 of FIG. 9.

Figure 18:
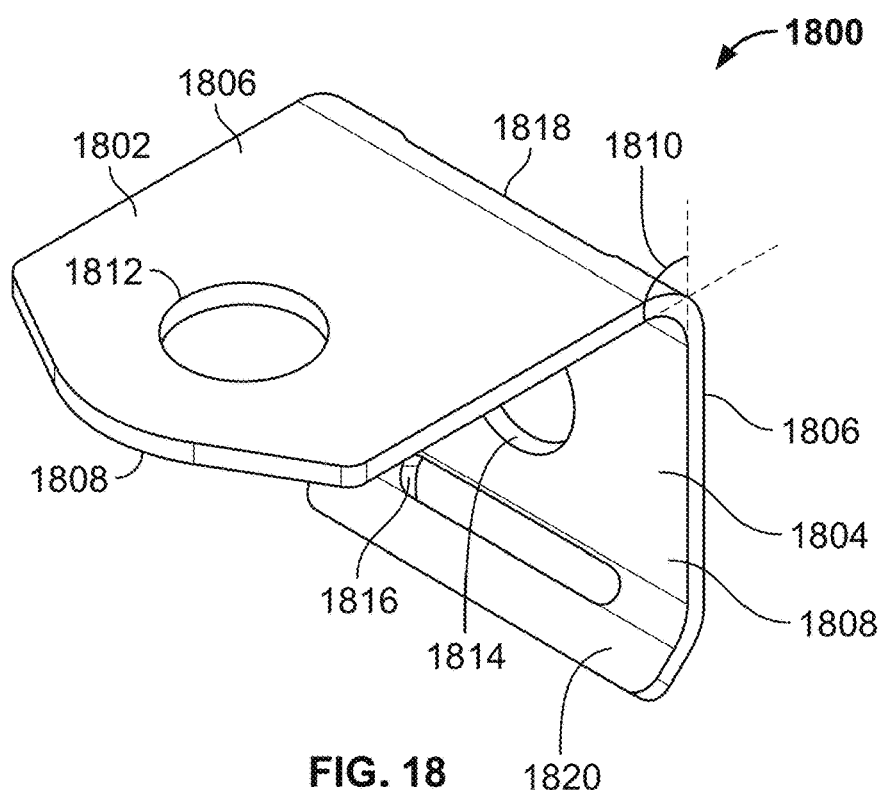
FIG. 18 is a perspective view of an example adapter bracket constructed in accordance with the teachings of this disclosure.
Figure 19:
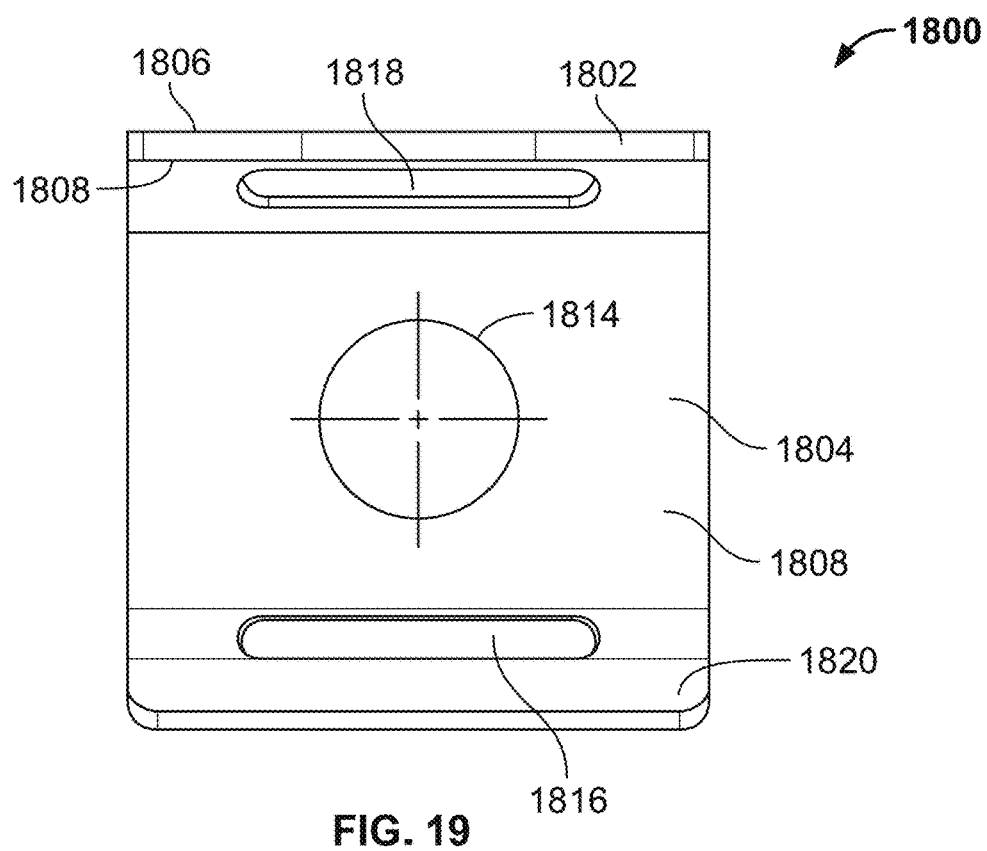
FIG. 19 is a front view of the example adapter bracket of FIG. 18.
Figure 20:
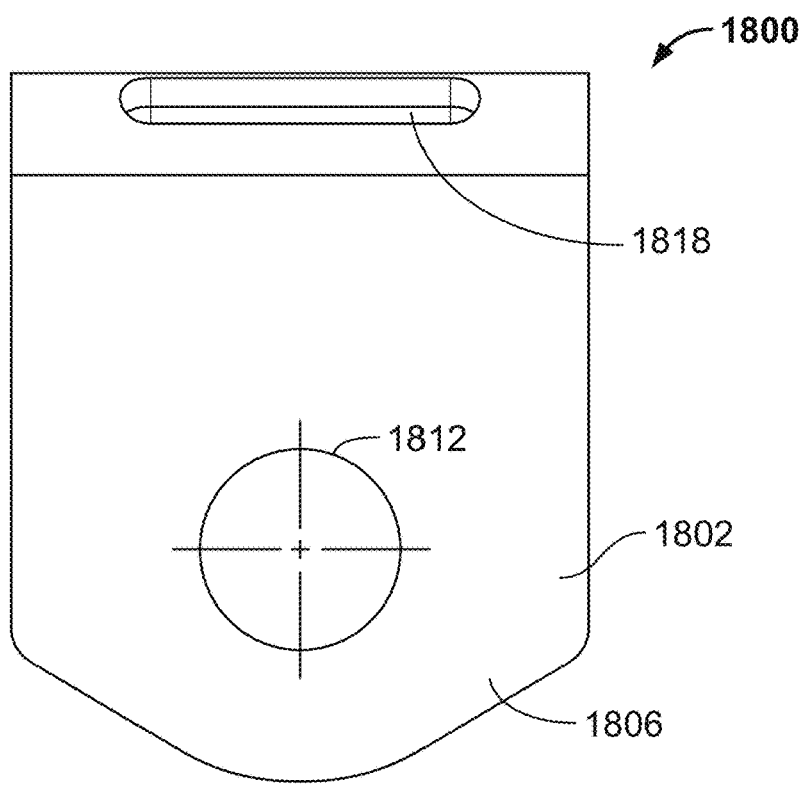
FIG. 20 is a plan view of the example adapter bracket of FIGS. 18 and 19.
Figure 21:
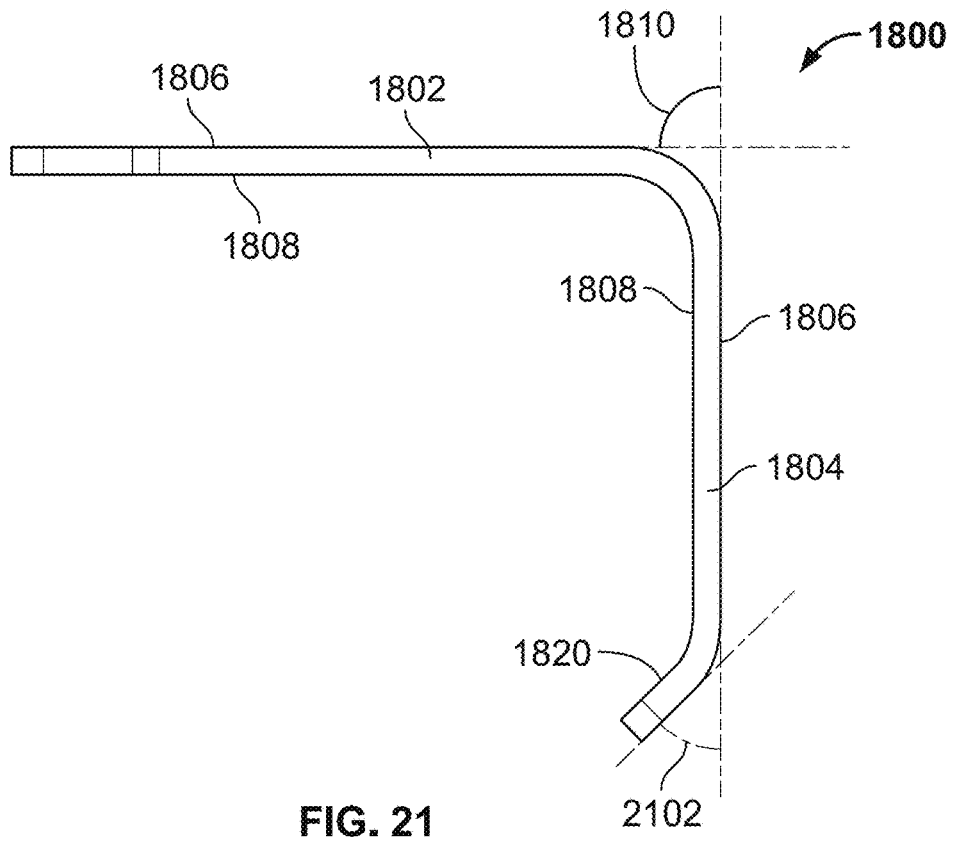
FIG. 21 is a side view of the example adapter bracket of FIGS. 18-20.

FIG. 18 is a perspective view of an example adapter bracket 1800 constructed in accordance with the teachings of this disclosure. FIG. 19 is a front view of the example adapter bracket 1800 of FIG. 18. FIG. 20 is a plan view of the example adapter bracket 1800 of FIGS. 18 and 19. FIG. 21 is a side view of the example adapter bracket 1800 of FIGS. 18-20. The adapter bracket 1800 of FIGS. 18-21 advantageously enables a mounting bracket (e.g., the first example mounting bracket 200 of FIGS. 2-6, the second example mounting bracket 900 of FIGS. 9-13, etc.) to be mounted to an object in multiple orientations (e.g., a horizontal orientation, a vertical orientation orthogonal to the horizontal orientation, etc.) such that a polarized direction associated with the mounting bracket may be aligned and/or consistent with a polarized direction associated with an RFID tag reader and/or interrogator (e.g., co-polarization). For example, if the RFID tag reader is horizontally polarized, the adapter bracket 1800 of FIGS. 18-21 may be arranged in a first orientation to make the mounting bracket similarly horizontally polarized. If the RFID tag reader is instead vertically polarized, the adapter bracket 1800 of FIGS. 18-21 may alternatively be arranged in a second orientation (e.g., orthogonal to the first orientation) to make the mounting bracket similarly vertically polarized.

The adapter bracket 1800 of FIGS. 18-21 includes a first example attachment arm 1802 and a second example attachment arm 1804 extending from the first attachment arm 1802. In the illustrated example of FIGS. 18-21, the first attachment arm 1802, the second attachment arm 1804, and/or, more generally, the adapter bracket 1800 has/have an example outer surface 1806 and an example inner surface 1808 located opposite the outer surface 1806. The second attachment arm 1804 of FIGS. 18-21 is bent and/or positioned at an example angle 1810 relative to the first attachment arm 1802 of FIGS. 18-21. In the illustrated example of FIGS. 18-21, the angle 1810 is approximately ninety degrees (90°). In other examples, the angle 1810 may range in value from approximately forty-five degrees (45°) to approximately one hundred thirty-five degrees (135°).

The first attachment arm 1802 of the adapter bracket 1800 of FIGS. 18-21 includes an example through hole 1812 passing from the outer surface 1806 of the first attachment arm 1802 through to the inner surface 1808 of the first attachment arm 1802. The through hole 1812 is configured to receive a fastener (not shown) to fasten and/or couple the first attachment arm 1802 of the adapter bracket 1800 of FIGS. 18-21 to a mounting bracket (e.g., the first mounting bracket 200 of FIGS. 2-6, the second mounting bracket 900 of FIGS. 9-13, etc.). The fastener may include, for example, a screw, a bolt, a rivet, a stud, a boss, a band, a cable tie, etc. In some examples, the fastener is preferably formed of a metallic material. In the illustrated example of FIGS. 18-21, the first attachment arm 1802 of the adapter bracket 1800 includes a single through hole 1812. In other examples, the first attachment arm 1802 of the adapter bracket 1800 may include a different number of through holes 1812 (e.g., two, three, four, etc.).

The first attachment arm 1802 of the adapter bracket 1800 of FIGS. 18-21 has a flat, generally rectangular, partially rounded shape. For example, as shown in FIGS. 18-21, the first attachment arm 1802 of the adapter bracket 1800 has a length of approximately 46.0 millimeters, a width of approximately 40.0 millimeters, and a thickness of approximately 2.0 millimeters, where the length and width are the dimensions of the outer surface 1806 of the first attachment arm 1802 and the thickness is the dimension between the outer surface 1806 and the inner surface 1808 of the first attachment arm 1802. In other examples, the first attachment arm 1802 of the adapter bracket 1800 of FIGS. 18-21 may have a shape and/or dimensions differing from that/those described above. For example, the first attachment arm 1802 may have a circular shape, an elliptical shape, a triangular shape, etc., or may have dimensions that are greater than or less than the dimensions described above.

The second attachment arm 1804 of the adapter bracket 1800 of FIGS. 18-21 includes a first example through hole 1814, a second example through hole 1816, and a third example through hole 1818, each of which passes from the outer surface 1806 of the second attachment arm 1804 through to the inner surface 1808 of the second attachment arm 1804. In the illustrated example of FIGS. 18-21, the second through hole 1816 and the third through hole 1818 are slot shaped. The first through hole 1814, the second through hole 1816, and the third through hole 1818 of FIGS. 18-21 are respectively configured to receive one or more fastener(s) (not shown) to fasten, couple, and/or mount the second attachment arm 1804 of the adapter bracket 1800 of FIGS. 18-21 to an object (e.g., a field device). The fastener(s) may include, for example, one or more screw(s), bolt(s), rivet(s), stud(s), boss(es), band(s), cable tie(s), etc. In some examples, one or more of the fastener(s) is/are preferably formed of a metallic material. In the illustrated example of FIGS. 18-21, the second attachment arm 1804 of the adapter bracket 1800 includes a total of three through holes (e.g., the first through hole 1814, the second through hole 1816, and the third through hole 1818). In other examples, the second attachment arm 1804 of the adapter bracket 1800 may include a different number of through holes (e.g., one, two, four, etc.).

The second attachment arm 1804 of the adapter bracket 1800 of FIGS. 18-21 also includes an example lip 1820. In instances where the second attachment arm 1804 of the adapter bracket 1800 is fastened, coupled, and/or mounted to an object (e.g., a field device) via a flexible fastener (e.g., a cable tie), the lip 1820 of FIGS. 18-21 may prevent the faster from slipping off the second attachment arm 1804, and may accordingly prevent the adapter bracket 1800 from separating from the object. As best shown in FIG. 21, the lip 1820 of FIGS. 18-21 is bent and/or positioned at an example angle 2102 relative to the second attachment arm 1804 of FIGS. 18-21. In the illustrated example of FIGS. 18-21, the angle 2102 is approximately forty-five degrees (45°). In other examples, the angle 2102 may range in value from approximately ten degrees (10°) to approximately one hundred thirty-five degrees (135°).

The second attachment arm 1804 of the adapter bracket 1800 of FIGS. 18-21 has a generally flat, generally rectangular shape. For example, as shown in FIGS. 18-21, the second attachment arm 1804 of the adapter bracket 1800 has a length of approximately 32.0 millimeters, a width of approximately 40.0 millimeters, and a thickness of approximately 2.0 millimeters, where the length and width are the dimensions of the outer surface 1806 of the second attachment arm 1804 and the thickness is the dimension between the outer surface 1806 and the inner surface 1808 of the second attachment arm 1804. In other examples, the second attachment arm 1804 of the adapter bracket 1800 of FIGS. 18-21 may have a shape and/or dimensions differing from that/those described above. For example, the second attachment arm 1804 may have a circular shape, an elliptical shape, a triangular shape, etc., or may have dimensions that are greater than or less than the dimensions described above.

Figure 22:
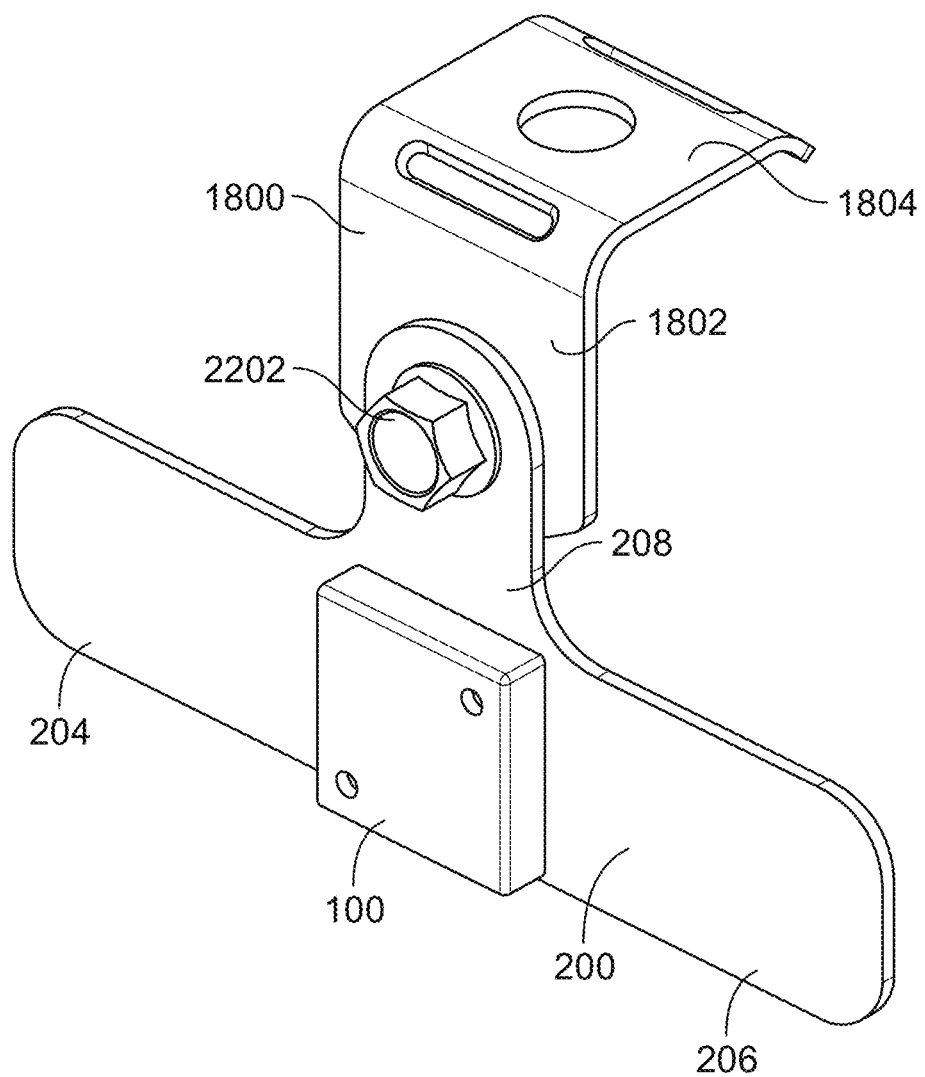
FIG. 22 is a perspective view of the first example mounting bracket of FIGS. 2-6 fastened to the example adapter bracket of FIGS. 18-21.

FIG. 22 is a perspective view of the first example mounting bracket 200 of FIGS. 2-6 fastened to the example adapter bracket 1800 of FIGS. 18-21. In the illustrated example of FIG. 22, the first attachment arm 1802 of the adapter bracket 1800 of FIGS. 18-22 is coupled to the mounting arm 208 of the mounting bracket 200 of FIGS. 2-6 and 22 via an example metallic fastener 2202. The metallic fastener 2202 of FIG. 22 passes through the through hole 1812 of the first attachment arm 1802 of FIGS. 18-22. The metallic fastener 2202 of FIG. 22 also passes through the through hole 228 of the mounting arm 208 of FIGS. 2-6 and 22.

Figure 23:
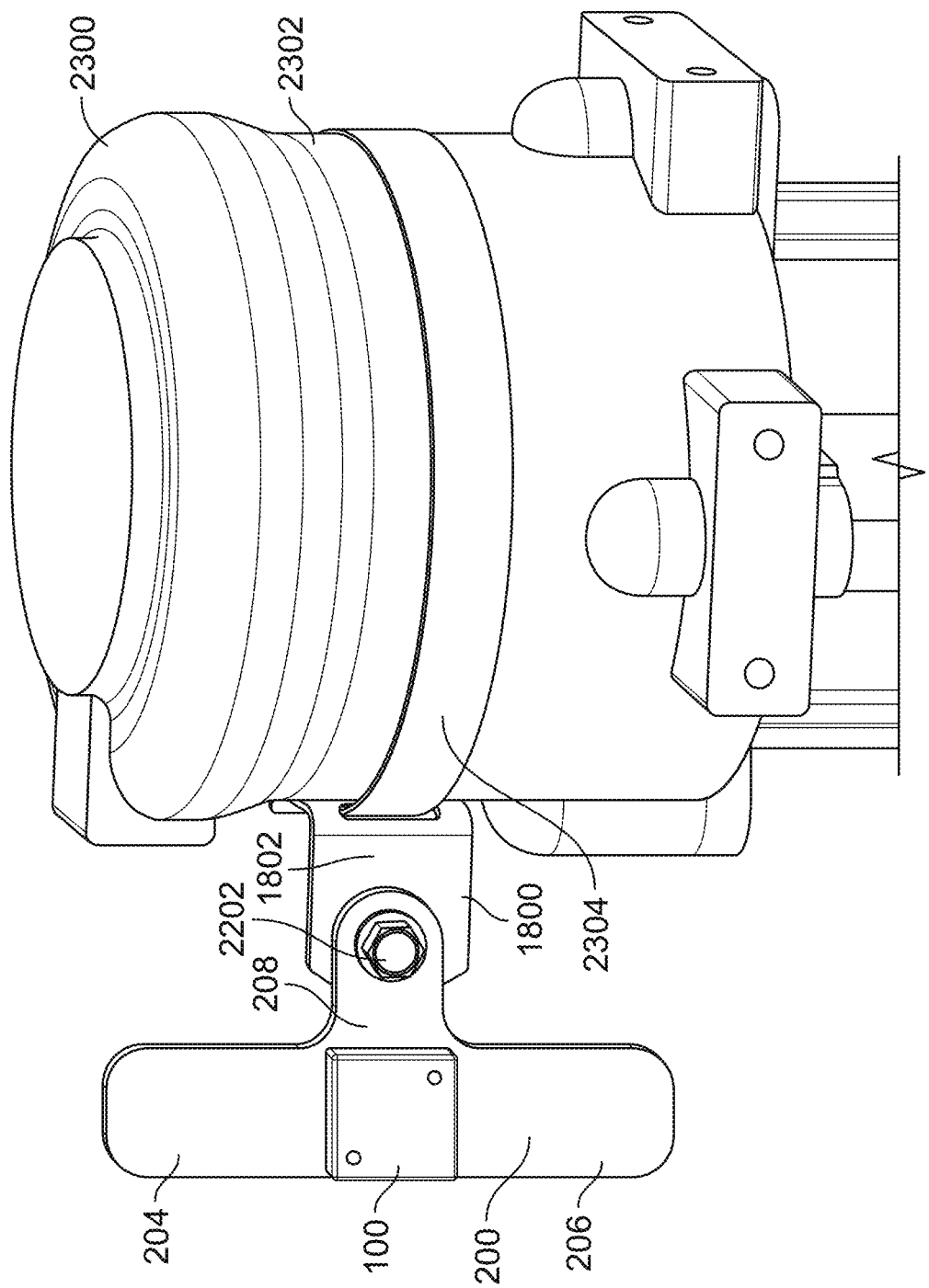
FIG. 23 is a perspective view of the first example mounting bracket of FIGS. 2-6 and 22 and the example adapter bracket of FIGS. 18-22 mounted to an example object.

FIG. 23 is a perspective view of the first example mounting bracket 200 of FIGS. 2-6 and 22 and the example adapter bracket 1800 of FIGS. 18-22 mounted to an example object 2300. In the illustrated example of FIG. 23, the object 2300 is an actuator having an example metallic casing 2302. In the illustrated example of FIG. 23, an example fastener 2304 (e.g., a metallic band) passes through the second through hole 1816 and the third through hole 1818 of the second attachment arm 1804 of the adapter bracket 1800, and is also banded around the metallic casing 2302 of the object 2300 to fasten, couple, and/or mount the adapter bracket 1800 to the object 2300. In other examples, the fastener 2304 of FIG. 23 may alternatively pass through the first through hole 1814 of the second attachment arm 1804 of the adapter bracket 1800 to fasten, couple, and/or mount the adapter bracket 1800 to the object 2300. In other examples, the fastener 2304 of FIG. 23 may alternatively be banded around the second attachment arm 1804 of the adapter bracket 1800 to fasten, couple, and/or mount the adapter bracket 1800 to the object 2300.

Figure 24:
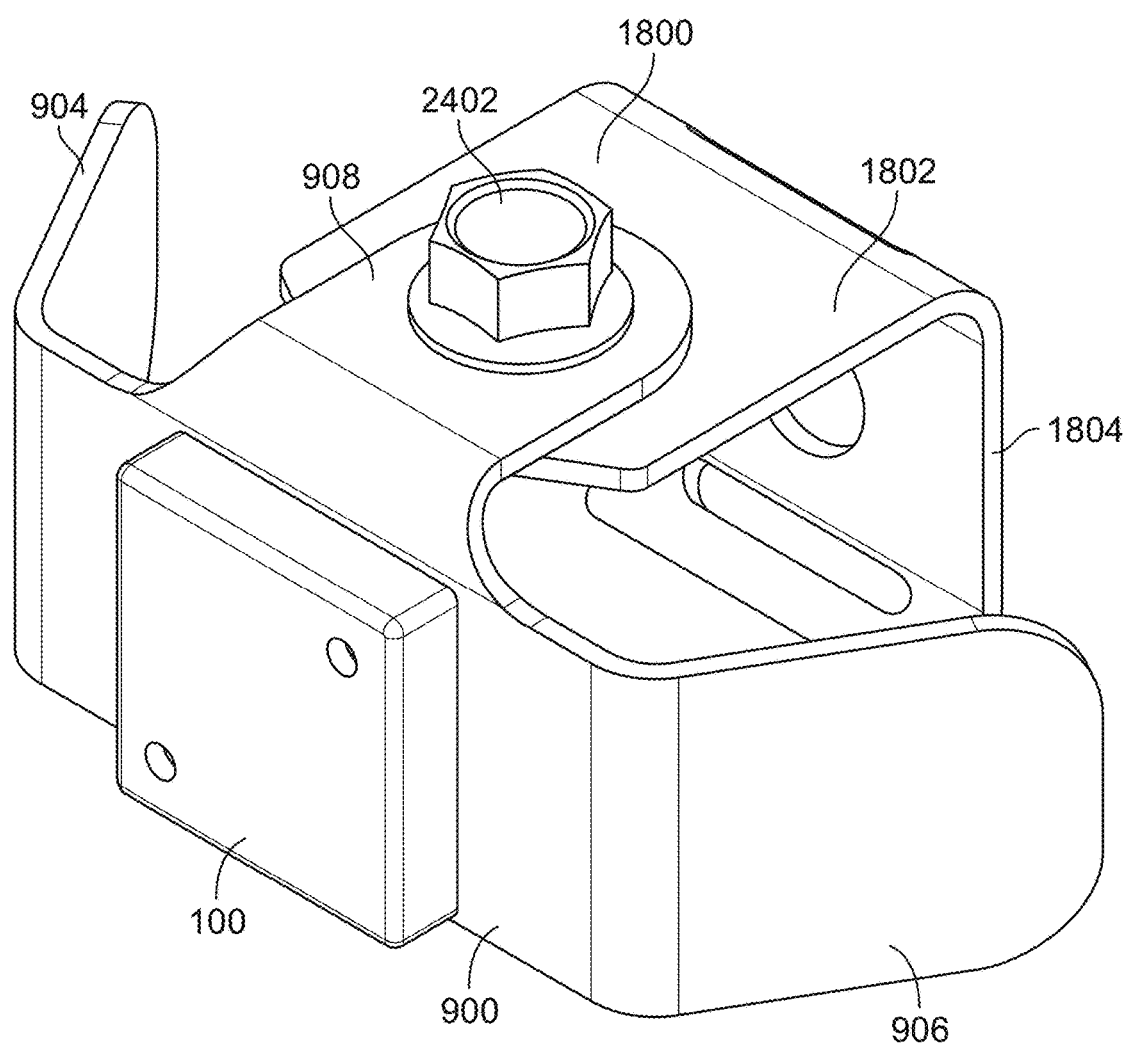
FIG. 24 is a perspective view of the second example mounting bracket of FIGS. 9-13 fastened to the example adapter bracket of FIGS. 18-21.

FIG. 24 is a perspective view of the second example mounting bracket 900 of FIGS. 9-13 fastened to the example adapter bracket 1800 of FIGS. 18-21. In the illustrated example of FIG. 24, the first attachment arm 1802 of the adapter bracket 1800 of FIGS. 18-21 and 24 is coupled to the mounting arm 908 of the mounting bracket 900 of FIGS. 9-13 and 24 via an example metallic fastener 2402. The metallic fastener 2402 of FIG. 24 passes through the through hole 1812 of the first attachment arm 1802 of FIGS. 18-21 and 24. The metallic fastener 2402 of FIG. 24 also passes through the through hole 928 of the mounting arm 908 of FIGS. 9-13 and 24.

Figure 25:
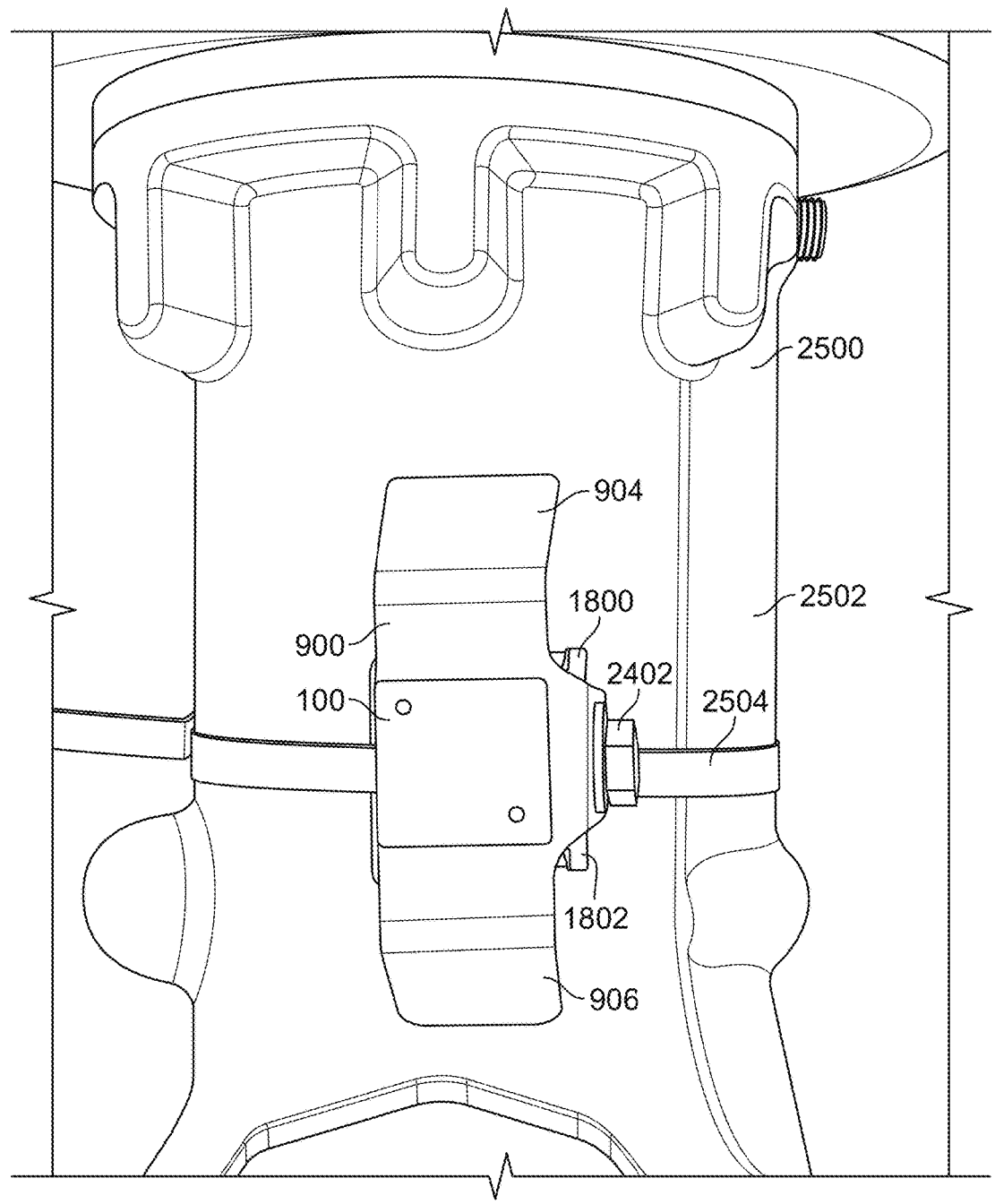
FIG. 25 is a perspective view of the second example mounting bracket of FIGS. 9-13 and 24 and the example adapter bracket of FIGS. 18-21 and 24 mounted to an example object.

FIG. 25 is a perspective view of the second example mounting bracket 900 of FIGS. 9-13 and 24 and the example adapter bracket 1800 of FIGS. 18-21 and 24 mounted to an example object 2500. In the illustrated example of FIG. 24, the object 2400 is an actuator having an example metallic casing 2402. In the illustrated example of FIG. 25, an example fastener 2504 (e.g., a cable tie) passes through the second through hole 1816 and the third through hole 1818 of the second attachment arm 1804 of the adapter bracket 1800, and is also banded around the metallic casing 2502 of the object 2500 to fasten, couple, and/or mount the adapter bracket 1800 to the object 2400. In other examples, the fastener 2404 of FIG. 24 may alternatively pass through the first through hole 1814 of the second attachment arm 1804 of the adapter bracket 1800 to fasten, couple, and/or mount the adapter bracket 1800 to the object 2400. In other examples, the fastener 2404 of FIG. 24 may alternatively be banded around the second attachment arm 1804 of the adapter bracket 1800 to fasten, couple, and/or mount the adapter bracket 1800 to the object 2400.

From the foregoing, it will be appreciated that the disclosed mounting bracket apparatus advantageously amplify the electromagnetic field strengths associated with known RFID tags, and accordingly increase the maximum communication ranges (e.g., maximum read ranges) associated with such RFID tags. In some examples, the disclosed mounting brackets may increase the maximum communication ranges (e.g., maximum read ranges) associated with such RFID tags from a distance of five feet or less to an improved distance of fifteen feet or more. The disclosed mounting brackets accordingly enable an RFID tag reader and/or interrogator to determine the identity and/or location of an RFID tag, and/or an object to which the RFID tag may be fastened, coupled, and/or mounted, from a safely-positioned remote location.

In some disclosed examples, an apparatus comprises a mounting bracket having a central portion, a first field amplification arm extending from the central portion in a first direction, a second field amplification arm extending from the central portion in a second direction different from the first direction, and a mounting arm extending from the central portion in a third direction different from the first direction and the second direction. In some disclosed examples, the apparatus further comprises an RFID tag mounted to the central portion of the mounting bracket.

In some disclosed examples, the first field amplification arm and the second field amplification arm are to amplify an electromagnetic field associated with the RFID tag. In some disclosed examples, the first field amplification arm and the second field amplification arm are to increase a communication range associated with the RFID tag.

In some disclosed examples, the mounting arm includes a through hole to receive a fastener to mount the mounting bracket to an object. In some disclosed examples, the central portion includes a through hole to receive a fastener to mount the RFID tag to the central portion.

In some disclosed examples, the central portion, the first field amplification arm, and the second field amplification arm are coplanar. In some disclosed examples, the first field amplification arm has a first free end and the second field amplification arm has a second free end located opposite the first free end. In some disclosed examples, the second free end is separated from the first free end by a distance equal to approximately one-half of a wavelength of a radio frequency at which the RFID tag is to operate. In some disclosed examples, the distance is between 115.0 millimeters and 165.0 millimeters. In some disclosed examples, the distance is approximately 140.0 millimeters.

In some disclosed examples, the second direction is parallel to the first direction, and the third direction is perpendicular to the first direction and the second direction. In some disclosed examples, the mounting arm is parallel to the central portion. In some disclosed examples, the mounting arm is perpendicular to the central portion.

In some disclosed examples, the first field amplification arm is positioned at a first angle relative to the central portion, and the second field amplification arm is positioned at a second angle relative to the central portion. In some disclosed examples, the second angle is equal to the first angle.

In some disclosed examples, an apparatus comprises a mounting bracket having a central portion, a first field amplification arm extending from the central portion in a first direction, a second field amplification arm extending from the central portion in a second direction different from the first direction, and a mounting arm extending from the central portion in a third direction different from the first direction and the second direction. In some disclosed examples, the central portion has a through hole to receive a fastener to mount an RFID tag to the central portion.

In some disclosed examples, the first field amplification arm and the second field amplification arm are to amplify an electromagnetic field associated with the RFID tag. In some disclosed examples, the first field amplification arm and the second field amplification arm are to increase a communication range associated with the RFID tag.

In some disclosed examples, the mounting arm includes a through hole to receive a fastener to mount the mounting bracket to an object.

In some disclosed examples, the central portion, the first field amplification arm, and the second field amplification arm are coplanar. In some disclosed examples, the first field amplification arm has a first free end and the second field amplification arm has a second free end located opposite the first free end. In some disclosed examples, the second free end is separated from the first free end by a distance equal to approximately one-half of a wavelength of a radio frequency at which the RFID tag is to operate. In some disclosed examples, the distance is between 115.0 millimeters and 165.0 millimeters. In some disclosed examples, the distance is approximately 140.0 millimeters.

In some disclosed examples, the second direction is parallel to the first direction, and the third direction is perpendicular to the first direction and the second direction. In some disclosed examples, the mounting arm is parallel to the central portion. In some disclosed examples, the mounting arm is perpendicular to the central portion.

In some disclosed examples, the first field amplification arm is positioned at a first angle relative to the central portion, and the second field amplification arm is positioned at a second angle relative to the central portion. In some disclosed examples, the second angle is equal to the first angle.

In some disclosed examples, an apparatus comprises a mounting bracket having a central portion, a first field amplification arm extending from the central portion in a first direction, a second field amplification arm extending from the central portion in a second direction different from the first direction, and a mounting arm extending from the central portion in a third direction different from the first direction and the second direction. In some disclosed examples, the apparatus further comprises an RFID tag mounted to the central portion of the mounting bracket. In some disclosed examples, the apparatus further comprises an adapter bracket to be coupled to the mounting bracket.

In some disclosed examples, the first field amplification arm and the second field amplification arm are to amplify an electromagnetic field associated with the RFID tag. In some disclosed examples, the first field amplification arm and the second field amplification arm are to increase a communication range associated with the RFID tag.

In some disclosed examples, the adapter bracket includes a first attachment arm and a second attachment arm. In some disclosed examples, the second attachment arm is positioned at an angle relative to the first attachment arm. In some disclosed examples, the mounting arm of the mounting bracket includes a first through hole and the first attachment arm of the adapter bracket includes a second through hole. In some disclosed examples, the first through hole and the second through hole are to receive a fastener to couple the mounting bracket to the adapter bracket. In some disclosed examples, the second attachment arm of the adapter bracket includes a third through hole, a fourth through hole, and a fifth through hole. In some disclosed examples, at least one of the third through hole, the fourth through hole, or the fifth through hole is to receive a fastener to couple the adapter bracket to an object.

In some disclosed examples, the central portion, the first field amplification arm, and the second field amplification arm are coplanar. In some disclosed examples, the first field amplification arm has a first free end and the second field amplification arm has a second free end located opposite the first free end. In some disclosed examples, the second free end is separated from the first free end by a distance equal to approximately one-half of a wavelength of a radio frequency at which the RFID tag is to operate. In some disclosed examples, the distance is between 115.0 millimeters and 165.0 millimeters. In some disclosed examples, the distance is approximately 140.0 millimeters.

In some disclosed examples, the second direction is parallel to the first direction, and the third direction is perpendicular to the first direction and the second direction. In some disclosed examples, the mounting arm is parallel to the central portion. In some disclosed examples, the mounting arm is perpendicular to the central portion.

In some disclosed examples, the first field amplification arm is positioned at a first angle relative to the central portion, and the second field amplification arm is positioned at a second angle relative to the central portion. In some disclosed examples, the second angle is equal to the first angle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a mounting bracket having a central portion, a first field amplification arm extending from the central portion in a first direction, a second field amplification arm extending from the central portion in a second direction different from the first direction, and a mounting arm extending from the central portion in a third direction different from the first direction and the second direction; and
   a radio frequency identification (RFID) tag mounted to the central portion of the mounting bracket;
   wherein the first field amplification arm and the second field amplification arm are to at least one of:
      amplify an electromagnetic field associated with the RFID tag; or
      increase a communication range associated with the RFID tag.

2. The apparatus of claim 1, wherein the mounting arm includes a through hole to receive a fastener to mount the mounting bracket to an object.

3. The apparatus of claim 1, wherein the central portion includes a through hole to receive a fastener to mount the RFID tag to the central portion.

4. The apparatus of claim 1, wherein the central portion, the first field amplification arm, and the second field amplification arm are coplanar.

5. The apparatus of claim 4, wherein the first field amplification arm has a first free end and the second field amplification arm has a second free end located opposite the first free end, the second free end being separated from the first free end by a distance equal to approximately one-half of a wavelength of a radio frequency at which the RFID tag is to operate.

6. The apparatus of claim 1, wherein the second direction is parallel to the first direction, and the third direction is perpendicular to the first direction and the second direction.

7. The apparatus of claim 1, wherein the mounting arm is parallel to the central portion.

8. The apparatus of claim 1, wherein the mounting arm is perpendicular to the central portion.

9. The apparatus of claim 1, wherein the first field amplification arm is positioned at a first angle relative to the central portion, and the second field amplification arm is positioned at a second angle relative to the central portion.

10. The apparatus of claim 9, wherein the second angle is equal to the first angle.

11. The apparatus of claim 1, further comprising an adapter bracket to be coupled to the mounting bracket, the adapter bracket including a first attachment arm and a second attachment arm, the second attachment arm being positioned at an angle relative to the first attachment arm.

12. An apparatus, comprising:
    a mounting bracket having a central portion, a first field amplification arm extending from the central portion in a first direction, a second field amplification arm extending from the central portion in a second direction different from the first direction, and a mounting arm extending from the central portion in a third direction different from the first direction and the second direction, the central portion having a through hole to receive a fastener to mount a radio frequency identification (RFID) tag to the central portion;
    wherein the first field amplification arm and the second field amplification arm are to at least one of:
       amplify an electromagnetic field associated with the RFID tag; or
       increase a communication range associated with the RFID tag.

13. The apparatus of claim 12, wherein the central portion, the first field amplification arm, and the second field amplification arm are coplanar.

14. The apparatus of claim 13, wherein the first field amplification arm has a first free end and the second field amplification arm has a second free end located opposite the first free end, the second free end being separated from the first free end by a distance equal to approximately one-half of a wavelength of a radio frequency at which the RFID tag is to operate.

15. An apparatus, comprising:
    a mounting bracket having a central portion, a first field amplification arm extending from the central portion in a first direction, a second field amplification arm extending from the central portion in a second direction different from the first direction, and a mounting arm extending from the central portion in a third direction different from the first direction and the second direction;
    a radio frequency identification (RFID) tag mounted to the central portion of the mounting bracket; and
    an adapter bracket to be coupled to the mounting bracket, the adapter bracket including a first attachment arm and a second attachment arm, the second attachment arm being positioned at an angle relative to the first attachment arm.

16. The apparatus of claim 15, wherein the first field amplification arm and the second field amplification arm are to amplify an electromagnetic field associated with the RFID tag.

17. The apparatus of claim 15, wherein the first field amplification arm and the second field amplification arm are to increase a communication range associated with the RFID tag.

18. The apparatus of claim 15, wherein the mounting arm of the mounting bracket includes a first through hole and the first attachment arm of the adapter bracket includes a second through hole, the first through hole and the second through hole to receive a fastener to couple the mounting bracket to the adapter bracket.

19. The apparatus of claim 15, wherein the central portion, the first field amplification arm, and the second field amplification arm are coplanar.

20. The apparatus of claim 19, wherein the first field amplification arm has a first free end and the second field amplification arm has a second free end located opposite the first free end, the second free end being separated from the first free end by a distance equal to approximately one-half of a wavelength of a radio frequency at which the RFID tag is to operate.

* * * * *